(12) United States Patent
Mignard et al.

(10) Patent No.: US 9,057,872 B2
(45) Date of Patent: Jun. 16, 2015

(54) DIELECTRIC ENHANCED MIRROR FOR IMOD DISPLAY

(75) Inventors: Marc Maurice Mignard, San Jose, CA (US); Kasra Khazeni, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 356 days.

(21) Appl. No.: 13/073,829

(22) Filed: Mar. 28, 2011

(65) Prior Publication Data

US 2012/0050299 A1 Mar. 1, 2012

Related U.S. Application Data

(60) Provisional application No. 61/378,853, filed on Aug. 31, 2010.

(51) Int. Cl.
*G02B 26/00* (2006.01)

(52) U.S. Cl.
CPC ..................... *G02B 26/001* (2013.01)

(58) Field of Classification Search
CPC .. G02B 26/08; G02B 26/0833; G02B 26/001; G02F 1/21
USPC ................. 359/290, 291, 292, 260, 315, 318, 359/224.1; 345/501; 356/454
See application file for complete search history.

(56) References Cited

U.S. PATENT DOCUMENTS

| | | |
|---|---|---|
| 2,590,906 A | 4/1952 | Tripp |
| 2,677,714 A | 5/1954 | Auwarter |
| 3,247,392 A | 4/1966 | Thelen |
| 3,679,313 A | 7/1972 | Rosenberg |
| 3,728,030 A | 4/1973 | Hawes |
| 3,886,310 A | 5/1975 | Guldberg |
| 3,955,190 A | 5/1976 | Teraishi |
| 4,403,248 A | 9/1983 | te Velde |
| 4,421,381 A | 12/1983 | Ueda et al. |
| 4,441,789 A | 4/1984 | Pohlack |
| 4,441,791 A | 4/1984 | Hornbeck |
| 4,497,974 A | 2/1985 | Deckman et al. |

(Continued)

FOREIGN PATENT DOCUMENTS

| | | |
|---|---|---|
| DE | 10 2006 039 071 | 2/2008 |
| EP | 0 035 299 | 9/1983 |

(Continued)

OTHER PUBLICATIONS

ISR and WO dated Dec. 7, 2011 in PCT/US11/049401.

(Continued)

*Primary Examiner* — Tuyen Tra
(74) *Attorney, Agent, or Firm* — Knobbe, Martens, Olson & Bear, LLP

(57) ABSTRACT

This disclosure provides systems, methods, and apparatus for display device including a dielectric stack positioned between a first electrically conductive layer and a second movable electrically conductive layer. In one aspect, the dielectric stack includes alternating dielectric layers of high and low indices of refraction. By controlling the refractive indices and thicknesses of layers within the dielectric stack, the display device's states of light reflection may be reversed, such that light is reflected when the movable layer is positioned in proximity to the first electrically conductive layer.

24 Claims, 20 Drawing Sheets

(56) References Cited

U.S. PATENT DOCUMENTS

| | | |
|---|---|---|
| 4,498,953 A | 2/1985 | Cook et al. |
| 4,560,435 A | 12/1985 | Brown et al. |
| 4,655,554 A | 4/1987 | Armitage |
| 4,705,361 A | 11/1987 | Frazier et al. |
| 4,779,959 A | 10/1988 | Saunders |
| 4,786,128 A | 11/1988 | Birnbach |
| 4,822,993 A | 4/1989 | Dillon et al. |
| 4,859,060 A | 8/1989 | Katagiri et al. |
| 4,925,259 A | 5/1990 | Emmett |
| 4,954,789 A | 9/1990 | Sampsell |
| 4,956,619 A | 9/1990 | Hornbeck |
| 4,973,131 A | 11/1990 | Carnes |
| 5,022,745 A | 6/1991 | Zayhowski et al. |
| 5,028,939 A | 7/1991 | Hornbeck et al. |
| 5,062,689 A | 11/1991 | Koehler |
| 5,091,983 A | 2/1992 | Lukosz |
| 5,096,279 A | 3/1992 | Hornbeck et al. |
| 5,170,283 A | 12/1992 | O'Brien et al. |
| 5,315,370 A | 5/1994 | Bulow |
| 5,381,232 A | 1/1995 | Van Wijk |
| 5,452,138 A | 9/1995 | Mignardi et al. |
| 5,471,341 A | 11/1995 | Warde et al. |
| 5,526,172 A | 6/1996 | Kanack |
| 5,550,373 A | 8/1996 | Cole et al. |
| 5,559,358 A | 9/1996 | Burns et al. |
| 5,561,523 A | 10/1996 | Blomberg et al. |
| 5,597,736 A | 1/1997 | Sampsell |
| 5,600,383 A | 2/1997 | Hornbeck |
| 5,636,052 A | 6/1997 | Arney et al. |
| 5,646,729 A | 7/1997 | Koskinen et al. |
| 5,646,768 A | 7/1997 | Kaeriyama |
| 5,661,592 A | 8/1997 | Bornstein et al. |
| 5,665,997 A | 9/1997 | Weaver et al. |
| 5,699,181 A | 12/1997 | Choi |
| 5,710,656 A | 1/1998 | Goossen |
| 5,719,068 A | 2/1998 | Suzawa et al. |
| 5,734,177 A | 3/1998 | Sakamoto |
| 5,771,116 A | 6/1998 | Miller et al. |
| 5,786,927 A | 7/1998 | Greywall et al. |
| 5,808,781 A | 9/1998 | Arney et al. |
| 5,818,095 A | 10/1998 | Sampsell |
| 5,825,528 A | 10/1998 | Goossen |
| 5,835,255 A | 11/1998 | Miles |
| 5,838,484 A | 11/1998 | Goossen et al. |
| 5,867,302 A | 2/1999 | Fleming |
| 5,870,221 A | 2/1999 | Goossen |
| 5,914,804 A | 6/1999 | Goossen |
| 5,920,418 A | 7/1999 | Shiono et al. |
| 5,961,848 A | 10/1999 | Jacquet et al. |
| 6,028,689 A | 2/2000 | Michalicek et al. |
| 6,031,653 A | 2/2000 | Wang |
| 6,040,937 A | 3/2000 | Miles |
| 6,046,659 A | 4/2000 | Loo et al. |
| 6,055,090 A | 4/2000 | Miles |
| 6,100,861 A | 8/2000 | Cohen et al. |
| 6,124,851 A | 9/2000 | Jacobson |
| 6,242,932 B1 | 6/2001 | Hembree |
| 6,262,697 B1 | 7/2001 | Stephenson |
| 6,301,000 B1 | 10/2001 | Johnson |
| 6,323,987 B1 | 11/2001 | Rinaudo et al. |
| 6,327,071 B1 | 12/2001 | Kimura |
| 6,335,235 B1 | 1/2002 | Bhekta et al. |
| 6,351,329 B1 | 2/2002 | Greywall |
| 6,356,378 B1 | 3/2002 | Huibers |
| 6,377,233 B2 | 4/2002 | Colgan et al. |
| 6,381,022 B1 | 4/2002 | Zavracky |
| 6,384,952 B1 | 5/2002 | Clark et al. |
| 6,400,738 B1 | 6/2002 | Tucker et al. |
| 6,433,917 B1 | 8/2002 | Mei et al. |
| 6,437,583 B1 | 8/2002 | Tartagni et al. |
| 6,438,282 B1 | 8/2002 | Takeda et al. |
| 6,452,712 B2 | 9/2002 | Atobe et al. |
| 6,466,354 B1 | 10/2002 | Gudeman |
| 6,519,073 B1 | 2/2003 | Goossen |
| 6,556,338 B2 | 4/2003 | Han et al. |
| 6,574,033 B1 | 6/2003 | Chui et al. |
| 6,597,490 B2 | 7/2003 | Tayebati |
| 6,608,268 B1 | 8/2003 | Goldsmith |
| 6,632,698 B2 | 10/2003 | Ives |
| 6,646,709 B2 | 11/2003 | Matsumoto |
| 6,650,455 B2 | 11/2003 | Miles |
| 6,657,832 B2 | 12/2003 | Williams et al. |
| 6,661,561 B2 | 12/2003 | Fitzpatrick et al. |
| 6,674,562 B1 | 1/2004 | Miles et al. |
| 6,680,792 B2 | 1/2004 | Miles |
| 6,698,295 B1 | 3/2004 | Sherrer |
| 6,710,908 B2 | 3/2004 | Miles et al. |
| 6,722,937 B1 | 4/2004 | Ludwig et al. |
| 6,738,194 B1 | 5/2004 | Ramirez et al. |
| 6,768,555 B2 | 7/2004 | Chen et al. |
| 6,794,119 B2 | 9/2004 | Miles |
| 6,813,059 B2 | 11/2004 | Hunter et al. |
| 6,836,366 B1 | 12/2004 | Flanders et al. |
| 6,841,081 B2 | 1/2005 | Chang et al. |
| 6,844,959 B2 | 1/2005 | Huibers et al. |
| 6,849,471 B2 | 2/2005 | Patel et al. |
| 6,862,127 B1 | 3/2005 | Ishii |
| 6,867,896 B2 | 3/2005 | Miles |
| 6,870,654 B2 | 3/2005 | Lin et al. |
| 6,882,458 B2 | 4/2005 | Lin et al. |
| 6,882,461 B1 | 4/2005 | Tsai et al. |
| 6,912,022 B2 | 6/2005 | Lin et al. |
| 6,913,942 B2 | 7/2005 | Patel et al. |
| 6,940,630 B2 | 9/2005 | Xie |
| 6,947,200 B2 | 9/2005 | Huibers |
| 6,952,303 B2 | 10/2005 | Lin et al. |
| 6,958,847 B2 | 10/2005 | Lin |
| 6,960,305 B2 | 11/2005 | Doan et al. |
| 6,962,834 B2 | 11/2005 | Stark |
| 6,980,350 B2 | 12/2005 | Hung et al. |
| 6,982,820 B2 | 1/2006 | Tsai |
| 7,002,726 B2 | 2/2006 | Patel et al. |
| 7,006,272 B2 | 2/2006 | Tsai |
| 7,009,754 B2 | 3/2006 | Huibers |
| 7,027,204 B2 | 4/2006 | Trisnadi et al. |
| 7,034,981 B2 | 4/2006 | Makigaki |
| 7,046,422 B2 | 5/2006 | Kimura et al. |
| 7,072,093 B2 | 7/2006 | Piehl et al. |
| 7,113,339 B2 | 9/2006 | Taguchi et al. |
| 7,119,945 B2 | 10/2006 | Kothari et al. |
| 7,122,937 B2 | 10/2006 | Hatakeyama et al. |
| 7,123,216 B1 | 10/2006 | Miles |
| 7,126,738 B2 | 10/2006 | Miles |
| 7,130,104 B2 | 10/2006 | Cummings |
| 7,184,195 B2 | 2/2007 | Yang |
| 7,184,202 B2 | 2/2007 | Miles et al. |
| 7,198,973 B2 | 4/2007 | Lin et al. |
| 7,221,495 B2 | 5/2007 | Miles et al. |
| 7,236,284 B2 | 6/2007 | Miles |
| 7,245,285 B2 | 7/2007 | Yeh et al. |
| 7,289,259 B2 | 10/2007 | Chui et al. |
| 7,302,157 B2 | 11/2007 | Chui |
| 7,321,456 B2 | 1/2008 | Cummings |
| 7,321,457 B2 | 1/2008 | Heald |
| 7,327,510 B2 | 2/2008 | Cummings et al. |
| 7,372,613 B2 | 5/2008 | Chui et al. |
| 7,372,619 B2 | 5/2008 | Miles |
| 7,385,744 B2 | 6/2008 | Kogut et al. |
| 7,385,762 B2 | 6/2008 | Cummings |
| 7,400,488 B2 | 7/2008 | Lynch et al. |
| 7,405,852 B2 | 7/2008 | Brosnihan et al. |
| 7,417,746 B2 | 8/2008 | Lin et al. |
| 7,420,725 B2 | 9/2008 | Kothari |
| 7,433,555 B2 | 10/2008 | Lee et al. |
| 7,436,573 B2 | 10/2008 | Doan et al. |
| 7,459,402 B2 | 12/2008 | Doan et al. |
| 7,460,291 B2 | 12/2008 | Sampsell et al. |
| 7,460,292 B2 | 12/2008 | Chou |
| 7,476,327 B2 | 1/2009 | Tung et al. |
| 7,477,440 B1 | 1/2009 | Huang et al. |
| 7,492,503 B2 | 2/2009 | Chui |
| 7,508,566 B2 | 3/2009 | Feenstra et al. |
| 7,515,327 B2 | 4/2009 | Cummings |
| 7,527,995 B2 | 5/2009 | Sampsell |

(56) References Cited

U.S. PATENT DOCUMENTS

| | | |
|---|---|---|
| 7,532,377 B2 | 5/2009 | Miles |
| 7,535,621 B2 | 5/2009 | Chiang |
| 7,542,198 B2 | 6/2009 | Kothari |
| 7,550,794 B2 | 6/2009 | Miles et al. |
| 7,550,810 B2 | 6/2009 | Mignard et al. |
| 7,554,711 B2 | 6/2009 | Miles |
| 7,554,714 B2 | 6/2009 | Chui et al. |
| 7,561,321 B2 | 7/2009 | Heald |
| 7,564,612 B2 | 7/2009 | Chui |
| 7,566,664 B2 | 7/2009 | Yan et al. |
| 7,566,940 B2 | 7/2009 | Sasagawa et al. |
| 7,567,373 B2 | 7/2009 | Chui et al. |
| 7,569,488 B2 | 8/2009 | Rafanan |
| 7,573,547 B2 | 8/2009 | Palmateer et al. |
| 7,612,932 B2 | 11/2009 | Chui et al. |
| 7,612,933 B2 | 11/2009 | Djordjev |
| 7,629,197 B2 | 12/2009 | Luo et al. |
| 7,630,114 B2 | 12/2009 | Wang et al. |
| 7,630,119 B2 | 12/2009 | Tung et al. |
| 7,630,121 B2 | 12/2009 | Endisch et al. |
| 7,643,199 B2 | 1/2010 | Lan |
| 7,643,202 B2 | 1/2010 | Sasagawa |
| 7,649,671 B2 | 1/2010 | Kothari et al. |
| 7,663,794 B2 | 2/2010 | Cummings |
| 7,672,035 B2 | 3/2010 | Sampsell et al. |
| 7,692,844 B2 | 4/2010 | Miles |
| 7,704,772 B2 | 4/2010 | Tung et al. |
| 7,715,079 B2 | 5/2010 | Kogut et al. |
| 7,715,085 B2 | 5/2010 | Sasagawa |
| 7,719,500 B2 | 5/2010 | Chui |
| 7,733,552 B2 | 6/2010 | Londergan et al. |
| 7,738,157 B2 | 6/2010 | Miles |
| 7,742,220 B2 | 6/2010 | Kogut et al. |
| 7,746,539 B2 | 6/2010 | Sampsell |
| 7,768,690 B2 | 8/2010 | Sampsell |
| 7,773,286 B2 | 8/2010 | Mignard |
| 7,782,517 B2 | 8/2010 | Griffiths et al. |
| 7,782,523 B2 | 8/2010 | Ishii |
| 7,787,173 B2 | 8/2010 | Chui |
| 7,808,694 B2 | 10/2010 | Miles |
| 7,813,029 B2 | 10/2010 | Kothari et al. |
| 7,816,164 B2 | 10/2010 | Kothari et al. |
| 7,826,120 B2 | 11/2010 | Miles |
| 7,830,586 B2 | 11/2010 | Miles |
| 7,830,587 B2 | 11/2010 | Miles |
| 7,830,588 B2 | 11/2010 | Miles |
| 7,835,061 B2 | 11/2010 | Kogut et al. |
| 7,839,557 B2 | 11/2010 | Chui et al. |
| 7,847,999 B2 | 12/2010 | Lee et al. |
| 7,848,003 B2 | 12/2010 | Kothari et al. |
| 7,852,544 B2 | 12/2010 | Sampsell |
| 7,852,545 B2 | 12/2010 | Miles |
| 7,855,826 B2 | 12/2010 | de Groot |
| 7,859,740 B2 | 12/2010 | Tung |
| 7,872,792 B2 | 1/2011 | Miles |
| 7,884,989 B2 | 2/2011 | Gally et al. |
| 7,889,415 B2 | 2/2011 | Kothari |
| 7,889,417 B2 | 2/2011 | Sasagawa |
| 7,893,919 B2 | 2/2011 | Kothari et al. |
| 7,898,722 B2 | 3/2011 | Miles |
| 7,898,723 B2 | 3/2011 | Khazeni et al. |
| 7,924,494 B2 | 4/2011 | Tung et al. |
| 7,936,497 B2 | 5/2011 | Chui et al. |
| 7,944,599 B2 | 5/2011 | Chui et al. |
| 7,944,604 B2 | 5/2011 | Ganti et al. |
| 7,948,671 B2 | 5/2011 | Tung et al. |
| 7,952,787 B2 | 5/2011 | Tung et al. |
| 8,213,075 B2 * | 7/2012 | Chui et al. ................ 359/290 |
| 2001/0003487 A1 | 6/2001 | Miles |
| 2001/0028503 A1 | 10/2001 | Flanders et al. |
| 2001/0043171 A1 | 11/2001 | Van Gorkom et al. |
| 2002/0054424 A1 | 5/2002 | Miles |
| 2002/0070931 A1 | 6/2002 | Ishikawa |
| 2002/0075555 A1 | 6/2002 | Miles |
| 2002/0126364 A1 | 9/2002 | Miles |
| 2002/0146200 A1 | 10/2002 | Kurdle et al. |
| 2002/0149828 A1 | 10/2002 | Miles |
| 2002/0149834 A1 | 10/2002 | Mei et al. |
| 2002/0154422 A1 | 10/2002 | Sniegowski et al. |
| 2002/0197761 A1 | 12/2002 | Patel et al. |
| 2003/0011864 A1 | 1/2003 | Flanders |
| 2003/0016428 A1 | 1/2003 | Kato et al. |
| 2003/0035196 A1 | 2/2003 | Walker |
| 2003/0043157 A1 | 3/2003 | Miles |
| 2003/0053078 A1 | 3/2003 | Missey et al. |
| 2003/0112404 A1 | 6/2003 | Kim |
| 2003/0119221 A1 | 6/2003 | Cunningham et al. |
| 2003/0123125 A1 | 7/2003 | Little |
| 2003/0138669 A1 | 7/2003 | Kojima et al. |
| 2003/0173504 A1 | 9/2003 | Cole et al. |
| 2003/0179455 A1 | 9/2003 | Hunt |
| 2003/0202265 A1 | 10/2003 | Reboa et al. |
| 2003/0202266 A1 | 10/2003 | Ring et al. |
| 2004/0008396 A1 | 1/2004 | Stappaerts |
| 2004/0008438 A1 | 1/2004 | Sato |
| 2004/0027671 A1 | 2/2004 | Wu et al. |
| 2004/0027701 A1 | 2/2004 | Ishikawa |
| 2004/0043552 A1 | 3/2004 | Strumpell et al. |
| 2004/0066477 A1 | 4/2004 | Morimoto et al. |
| 2004/0075967 A1 | 4/2004 | Lynch et al. |
| 2004/0076802 A1 | 4/2004 | Tompkin et al. |
| 2004/0080035 A1 | 4/2004 | Delapierre |
| 2004/0100594 A1 | 5/2004 | Huibers et al. |
| 2004/0100677 A1 | 5/2004 | Huibers et al. |
| 2004/0125281 A1 | 7/2004 | Lin et al. |
| 2004/0145811 A1 | 7/2004 | Lin et al. |
| 2004/0147198 A1 | 7/2004 | Lin et al. |
| 2004/0157360 A1 | 8/2004 | Gracias |
| 2004/0175577 A1 | 9/2004 | Lin et al. |
| 2004/0184134 A1 | 9/2004 | Makigaki |
| 2004/0188599 A1 | 9/2004 | Viktorovitch et al. |
| 2004/0207897 A1 | 10/2004 | Lin |
| 2004/0209195 A1 | 10/2004 | Lin |
| 2004/0217264 A1 | 11/2004 | Wood et al. |
| 2004/0217919 A1 | 11/2004 | Pichi et al. |
| 2004/0218251 A1 | 11/2004 | Piehl et al. |
| 2004/0259010 A1 | 12/2004 | Kanbe |
| 2005/0002082 A1 | 1/2005 | Miles |
| 2005/0003667 A1 | 1/2005 | Lin et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0046919 A1 | 3/2005 | Taguchi et al. |
| 2005/0046922 A1 | 3/2005 | Lin et al. |
| 2005/0046948 A1 | 3/2005 | Lin |
| 2005/0068627 A1 | 3/2005 | Nakamura et al. |
| 2005/0078348 A1 | 4/2005 | Lin |
| 2005/0117190 A1 | 6/2005 | Iwauchi et al. |
| 2005/0117623 A1 | 6/2005 | Shchukin et al. |
| 2005/0128543 A1 | 6/2005 | Phillips et al. |
| 2005/0133761 A1 | 6/2005 | Thielemans |
| 2005/0168849 A1 | 8/2005 | Lin |
| 2005/0179378 A1 | 8/2005 | Oooka et al. |
| 2005/0195462 A1 | 9/2005 | Lin |
| 2005/0254115 A1 | 11/2005 | Palmateer et al. |
| 2005/0258516 A1 | 11/2005 | Hong et al. |
| 2005/0275930 A1 | 12/2005 | Patel et al. |
| 2006/0007517 A1 | 1/2006 | Tsai |
| 2006/0017379 A1 | 1/2006 | Su et al. |
| 2006/0017689 A1 | 1/2006 | Faase et al. |
| 2006/0024880 A1 | 2/2006 | Chui et al. |
| 2006/0038643 A1 | 2/2006 | Xu et al. |
| 2006/0065940 A1 | 3/2006 | Kothari |
| 2006/0066641 A1 | 3/2006 | Gally et al. |
| 2006/0077124 A1 | 4/2006 | Gally et al. |
| 2006/0077155 A1 | 4/2006 | Chui et al. |
| 2006/0082588 A1 | 4/2006 | Mizuno et al. |
| 2006/0082863 A1 | 4/2006 | Piehl et al. |
| 2006/0132927 A1 | 6/2006 | Yoon |
| 2006/0180886 A1 | 8/2006 | Tsang |
| 2006/0220160 A1 | 10/2006 | Miles |
| 2007/0020948 A1 | 1/2007 | Piehl et al. |
| 2007/0077525 A1 | 4/2007 | Davis et al. |
| 2007/0086078 A1 | 4/2007 | Hagood et al. |

(56) References Cited

U.S. PATENT DOCUMENTS

| | | | |
|---|---|---|---|
| 2007/0097694 A1 | 5/2007 | Faase et al. |
| 2007/0138608 A1 | 6/2007 | Ikehashi |
| 2007/0139655 A1 | 6/2007 | Luo |
| 2007/0153860 A1 | 7/2007 | Chang-Hasnain et al. |
| 2007/0216987 A1 | 9/2007 | Hagood et al. |
| 2007/0242345 A1 | 10/2007 | Natarajan et al. |
| 2007/0253054 A1 | 11/2007 | Miles |
| 2007/0279730 A1 | 12/2007 | Heald |
| 2007/0285761 A1 | 12/2007 | Zhong et al. |
| 2008/0002299 A1 | 1/2008 | Thurn |
| 2008/0030657 A1 | 2/2008 | Wu et al. |
| 2008/0037104 A1 | 2/2008 | Hagood et al. |
| 2008/0055706 A1 | 3/2008 | Chui et al. |
| 2008/0068697 A1 | 3/2008 | Haluzak et al. |
| 2008/0080043 A1 | 4/2008 | Chui et al. |
| 2008/0088910 A1 | 4/2008 | Miles |
| 2008/0110855 A1 | 5/2008 | Cummings |
| 2008/0137025 A1 | 6/2008 | Ueda |
| 2008/0158645 A1 | 7/2008 | Chiang |
| 2008/0186581 A1 | 8/2008 | Bita et al. |
| 2008/0297880 A1 | 12/2008 | Steckl et al. |
| 2009/0021884 A1 | 1/2009 | Nakamura |
| 2009/0078316 A1 | 3/2009 | Khazeni |
| 2009/0101192 A1 | 4/2009 | Kothari et al. |
| 2009/0103166 A1 | 4/2009 | Khazeni et al. |
| 2009/0122384 A1 | 5/2009 | Felnhofer et al. |
| 2009/0126777 A1 | 5/2009 | Khazeni et al. |
| 2009/0159123 A1 | 6/2009 | Kothari |
| 2009/0166857 A1 | 7/2009 | Lee |
| 2009/0211885 A1 | 8/2009 | Steeneken et al. |
| 2009/0213450 A1 | 8/2009 | Sampsell |
| 2009/0213451 A1 | 8/2009 | Tung et al. |
| 2009/0231666 A1 | 9/2009 | Gudlavalleti et al. |
| 2009/0256218 A1 | 10/2009 | Mignard et al. |
| 2009/0257105 A1 | 10/2009 | Xu et al. |
| 2009/0279162 A1 | 11/2009 | Chui |
| 2009/0293955 A1 | 12/2009 | Kothari et al. |
| 2009/0323153 A1 | 12/2009 | Sampsell |
| 2010/0014148 A1 | 1/2010 | Djordjev |
| 2010/0020382 A1 | 1/2010 | Su et al. |
| 2010/0051089 A1 | 3/2010 | Khazeni et al. |
| 2010/0053148 A1 | 3/2010 | Khazeni et al. |
| 2010/0096006 A1 | 4/2010 | Griffiths |
| 2010/0096011 A1 | 4/2010 | Griffiths |
| 2010/0118382 A1 | 5/2010 | Kothari et al. |
| 2010/0236624 A1 | 9/2010 | Khazeni et al. |
| 2010/0238572 A1 | 9/2010 | Tao et al. |
| 2010/0309572 A1 | 12/2010 | Mignard |
| 2011/0019380 A1 | 1/2011 | Miles |
| 2011/0026095 A1 | 2/2011 | Kothari et al. |
| 2011/0026096 A1 | 2/2011 | Miles |
| 2011/0038027 A1 | 2/2011 | Miles |
| 2011/0044496 A1 | 2/2011 | Chui et al. |
| 2011/0063712 A1 | 3/2011 | Kothari et al. |
| 2011/0069371 A1 | 3/2011 | Kothari et al. |
| 2011/0075241 A1 | 3/2011 | Mienko et al. |
| 2011/0075245 A1 | 3/2011 | Hashimura et al. |
| 2011/0080632 A1 | 4/2011 | Miles |
| 2011/0090554 A1 | 4/2011 | Tung |
| 2011/0116156 A1 | 5/2011 | Kothari |
| 2011/0134505 A1 | 6/2011 | Sasagawa |
| 2011/0169724 A1 | 7/2011 | Tao et al. |
| 2011/0170166 A1 | 7/2011 | Miles |
| 2011/0170167 A1 | 7/2011 | Miles |
| 2011/0170168 A1 | 7/2011 | Endisch et al. |
| 2011/0188109 A1 | 8/2011 | Chui et al. |
| 2011/0188110 A1 | 8/2011 | Miles |
| 2011/0194169 A1 | 8/2011 | Ganti et al. |
| 2012/0235959 A1 | 9/2012 | Endisch |

FOREIGN PATENT DOCUMENTS

| | | |
|---|---|---|
| EP | 0 668 490 | 8/1995 |
| EP | 0 695 959 | 2/1996 |
| EP | 0 879 991 | 11/1998 |
| EP | 0 969 306 | 1/2000 |
| EP | 0 986 077 | 3/2000 |
| EP | 1 122 577 | 8/2001 |
| EP | 1 205 782 | 5/2002 |
| EP | 1 227 346 | 7/2002 |
| EP | 1 275 997 | 1/2003 |
| EP | 1 403 212 | 3/2004 |
| EP | 1457804 A1 | 9/2004 |
| EP | 1 473 581 | 11/2004 |
| EP | 1 928 028 | 6/2008 |
| EP | 2 030 947 | 3/2009 |
| GB | 844877 A | 8/1960 |
| GB | 2443352 A | 4/2008 |
| JP | 56-088111 | 7/1981 |
| JP | 5-49238 | 2/1993 |
| JP | 5-281479 | 10/1993 |
| JP | 08-051230 | 2/1996 |
| JP | 11-211999 | 8/1999 |
| JP | 2000 147262 | 5/2000 |
| JP | 2001-221913 | 8/2001 |
| JP | 2001 249283 | 9/2001 |
| JP | 2002-062490 | 2/2002 |
| JP | 2002-221678 | 8/2002 |
| JP | 2003-340795 | 2/2003 |
| JP | 2003 177336 | 6/2003 |
| JP | 2004-012642 | 1/2004 |
| JP | 2004-212638 | 7/2004 |
| JP | 2004-212680 | 7/2004 |
| JP | 2005 279831 | 10/2005 |
| JP | 2005-308871 | 11/2005 |
| JP | 2007 027150 | 2/2007 |
| JP | 2010002776 A | 1/2010 |
| WO | WO-9530924 A1 | 11/1995 |
| WO | WO 98/14804 | 4/1998 |
| WO | WO 98/43129 | 10/1998 |
| WO | WO 01/53113 | 7/2001 |
| WO | WO 02/24570 | 3/2002 |
| WO | WO 02/086582 | 10/2002 |
| WO | WO 03/105198 | 12/2003 |
| WO | WO-2005019899 A1 | 3/2005 |
| WO | WO 2006/035698 | 4/2006 |
| WO | WO-2006036559 A1 | 4/2006 |
| WO | WO 2007/036422 | 4/2007 |
| WO | WO 2007/045875 | 4/2007 |
| WO | WO 2007/053438 | 5/2007 |
| WO | WO-2007053308 A2 | 5/2007 |
| WO | WO 2007/072998 | 6/2007 |
| WO | WO 2008/062363 | 5/2008 |
| WO | WO-2008115716 A2 | 9/2008 |

OTHER PUBLICATIONS

Billard, Tunable Capacitor, 5th Annual Review of LETI, Jun. 24, 2003, p. 7.

Conner, Hybrid Color Display Using Optical Interference Filter Array, SID Digest, pp. 577-580 (1993).

Feenstra et al., Electrowetting displays, Liquavista BV, 16 pp., Jan. 2006.

Hohlfeld et al., Jun. 2003, Micro-machined tunable optical filters with optimized band-pass spectrum, 12th International Conference on Transducers, Solid-State Sensors, Actuators and Microsystems, 2:1494-1497.

Jerman et al., A Miniature Fabry-Perot Interferometer with a Corrugated Silicon Diaphragm Support, (1988).

Jerman et al., Miniature Fabry-Perot Interferometers Micromachined in Silicon for Use in Optical Fiber WDM Systems, Transducers, San Francisco, Jun. 24-27, 1991, Proceedings on the Int'l. Conf. on Solid State Sensors and Actuators, Jun. 24, 1991, pp. 372-375.

Kowarz et al., Conformal grating electromechanical system (GEMS) for high-speed digital light modulation, Proceedings of the IEEEE 15th. Annual International Conference on Micro Electro Mechanical Systems, MEMS 2002, pp. 568-573.

Lezec, Submicrometer dimple array based interference color field displays and sensors, Nano Lett. 7(2):329-333, Dec. 23, 2006.

Londergan et al., Advanced processes for MEMS-based displays, Proceedings of the Asia Display 2007, SID, 1:107-112.

(56) References Cited

OTHER PUBLICATIONS

Longhurst, 1963, Chapter IX: Multiple Beam Interferometry, in Geometrical and Physical Optics, pp. 153-157.
Mehregany et al., 1996, MEMS applications in optical systems, IEEE/LEOS 1996 Summer Topical Meetings, pp. 75-76.
Miles et al, Oct. 21, 1997, A MEMS based interferometric modulator (IMOD) for display applications, Proceedings of Sensors Expo, pp. 281-284.
Miles, A New Reflective FPD Technology Using Interferometric Modulation, Journal of the SID, 5/4, 1997.
Miles, Interferometric modulation: MOEMS as an enabling technology for high performance reflective displays, Proceedings of SPIE, 4985:131-139, 2003.
Nakagawa et al., Feb. 1, 2002, Wide-field-of-view narrow-band spectral filters based on photonic crystal nanocavities, Optics Letters, 27(3):191-193.
Nieminen et al., 2004, Design of a temperature-stable RF MEM capacitor, IEEE Journal of Microelectromechanical Systems, 13(5):705-714.
Written Opinion dated Aug. 1, 2012 in PCT/US11/049401.
International Preliminary Report on Patentability—PCT/US2011/049401—The International Bureau of WIPO—Geneva, Switzerland, Nov. 22, 2012.
Brosnihan et al., Jun. 2003, Optical IMEMS—a fabrication process for MEMS optical switches with integrated on-chip electronic, Transducers, Solid-State Sensors, Actuators and Microsystems, 12$^{th}$ International Conference 2003, 2(8-12):1638-1642.
Cacharelis et al., 1997, A Reflective-mode PDLC Light Valve Display Technology, Proceedings of European Solid State Device Research Conference (ESSDERC), pp. 596-599.
Dokmeci et al., Dec. 2004, Two-axis single-crystal silicon micromirror arrays, Journal of Microelectromechanical Systems, 13(6):1006-1017.
Maier et al., 1996, 1.3" active matrix liquid crystal spatial light modulator with 508 dpi resolution, SPIE vol. 2754, pp. 171-179.
Pape et al., Characteristics of the deformable mirror device for optical information processing, Optical Engineering, 22(6):676-681, Nov.-Dec. 1983.
Qualcomm MEMS Technologies, Inc., May 2008, Interferometric Modulator (IMOD) Technology Overview, White Paper, 14 pp.
Taii et al., A transparent sheet display by plastic MEMS, Journal of the SID 14(8):735-741, 2006.
Tolansky, 1948, Chapter II: Multiple-Beam Interference, in Multiple-bean Interferometry of Surfaces and Films, Oxford at the Clarendon Press, pp. 8-11.
Wang, Jun. 29-Jul. 1, 2002, Design and fabrication of a novel two-dimension MEMS-based tunable capacitor, IEEE 2002 International Conference on Communications, Circuits and Systems and West Sino Expositions, 2:1766-1769.

\* cited by examiner

Common Voltages

|  | $VC_{ADD\_H}$ | $VC_{HOLD\_H}$ | $VC_{REL}$ | $VC_{HOLD\_L}$ | $VC_{ADD\_L}$ |
|---|---|---|---|---|---|
| $VS_H$ | Stable | Stable | Relax | Stable | Actuate |
| $VS_L$ | Actuate | Stable | Relax | Stable | Stable |

Segment Voltages

DIELECTRIC ENHANCED MIRROR FOR IMOD DISPLAY

CROSS-REFERENCE TO RELATED APPLICATIONS

This disclosure claims priority to U.S. Provisional Patent Application No. 61/378,853, filed Aug. 31, 2010, entitled "DIELECTRIC ENHANCED MIRROR FOR IMOD DISPLAY," and assigned to the assignee hereof. The disclosure of the prior application is considered part of, and is incorporated by reference in, this disclosure.

TECHNICAL FIELD

This disclosure relates to electromechanical systems. More specifically, this disclosure relates to interferometric modulator devices including dielectric stacks.

DESCRIPTION OF THE RELATED TECHNOLOGY

Electromechanical systems include devices having electrical and mechanical elements, actuators, transducers, sensors, optical components (e.g., mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

SUMMARY

The systems, methods and devices of the present disclosure each have several innovative aspects, no single one of which is solely responsible for the desirable attributes disclosed herein.

One innovative aspect of the subject matter described in this disclosure can be implemented in a display device including a partially transparent and partially reflective layer, a first dielectric layer having a first thickness and a first index of refraction characteristic, a second dielectric layer having a second thickness and a second index of refraction characteristic, a reflective layer, and an optically resonant cavity. An optical path length of the first dielectric layer through the first thickness is about the same as an optical path length of the second dielectric layer through the second thickness and the first index of refraction characteristic is greater than the second index of refraction characteristic. The second dielectric layer is disposed between the reflective layer and the first dielectric layer and the optical resonant cavity is defined between the partially transparent and partially reflective layer and the reflective layer. In one aspect, the first index of refraction characteristic can be greater than 2.1 and/or the second index of refraction characteristic can be less than 1.6. In another aspect, the first dielectric layer can have an extinction coefficient characteristic that is less than 0.5. In one aspect, the device also can include an air gap defined between the partially transparent and partially reflective layer and the first dielectric layer.

Another innovative aspect of the subject matter described in this disclosure can be implemented in a display device including means for partially reflecting and partially transmitting light, first dielectric means having a first thickness and a first index of refraction characteristic, second dielectric means having a second thickness and a second index of refraction characteristic, means for reflecting light, and optically resonant means. An optical path length of the first dielectric means through the first thickness is about the same as an optical path length of the second dielectric means through the second thickness. The first index of refraction characteristic is greater than the second index of refraction characteristic and the first dielectric means is disposed between the partially reflective and partially transmissive means and the second dielectric means. The second dielectric means is disposed between the reflective means and the first dielectric means and the optically resonant means is defined between the partially reflective and partially transmissive means and the first reflective means. In one aspect, the first index of refraction characteristic can be greater than 2.1 and/or the second index of refraction characteristic can be less than 1.6.

One innovative aspect of the subject matter described in this disclosure can be implemented in a method of manufacturing a display device. The method includes providing a substrate, forming a partially reflective and partially transmissive layer on the substrate, forming a sacrificial layer on the partially transparent and partially reflective layer, forming a first dielectric layer on the sacrificial layer, the first dielectric layer having a first thickness and a first index of refraction characteristic, forming a second dielectric layer on the first dielectric layer, the second dielectric layer having a second thickness and a second index of refraction characteristic, forming a reflective layer on the second dielectric layer, and removing the sacrificial layer. An optical path length of the first dielectric layer through the first thickness is about the same as an optical path length of the second dielectric layer through the second thickness and the first index of refraction characteristic is greater than the second index of refraction characteristic. In one aspect, the first index of refraction characteristic can be greater than 2.1 and/or the second index of refraction characteristic can be less than 1.6.

Another innovative aspect of the subject matter described in this disclosure can be implemented in a display device including a partially transparent and partially reflective layer, a first dielectric layer having a first index of refraction characteristic, a second dielectric layer having a second index of refraction characteristic, a reflective layer, and an optically resonant cavity. The first index of refraction characteristic is greater than the second index of refraction characteristic, the second dielectric layer is disposed between the reflective layer and the first dielectric layer, and the optical resonant cavity is defined between and partially reflective layer and the reflective layer. The reflective layer, first dielectric layer, and second dielectric layer are configured to move together relative to the partially transparent and partially reflective layer between at least a first state, a second state, and a third state with the first state being closer to the partially transparent and partially reflective layer than the third state, and with the second state being disposed between the first state and the third state. In one aspect, the device can be configured to reflect a first color when the reflective layer is in the first state, a second color when the reflective layer is in the second state, and a third color when the reflective layer is in the third state. In another aspect, the first color can be different than the second color which can be different from the third color.

Additionally, an innovative aspect of the subject matter described in this disclosure can be implemented in a display device including means for partially reflecting and partially transmitting light, first dielectric means having a first index of refraction characteristic, second dielectric means having a second index of refraction characteristic, means for reflecting light, and optically resonant means defined between the partially reflective and partially transmissive means and the reflective means. The first index of refraction characteristic is greater than the second index of refraction characteristic and the second dielectric means is disposed between the reflective means and the first dielectric means. The reflective means, first dielectric means, and second dielectric means are configured to move together relative to the partially reflective and partially transmissive means between a first state, a second state, and a third state with the first state being closer to the partially reflective and partially transmissive means than the third state and with the second state being disposed between the first state and the third state. In one aspect, the first index of refraction characteristic can be greater than 2.1 and/or the second index of refraction characteristic can be less than 1.6.

Another innovative aspect of the subject matter described in this disclosure can be implemented in a method of manufacturing a display device. The method includes providing a substrate, forming a partially reflective and partially transmissive layer on the substrate, forming an oxidation inhibiting layer on the partially transparent and partially reflective layer, forming a sacrificial layer on the oxidation inhibiting layer, forming a first dielectric layer on the sacrificial layer, the first dielectric layer having an index of refraction characteristic that is greater than 2.1, forming a second dielectric layer on the first dielectric layer, the second dielectric layer having an index of refraction characteristic that is less than 1.6, forming a reflective layer on the second dielectric layer, and removing the sacrificial layer. In one aspect, the first dielectric layer can have an extinction coefficient characteristic that is less than 0.5.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
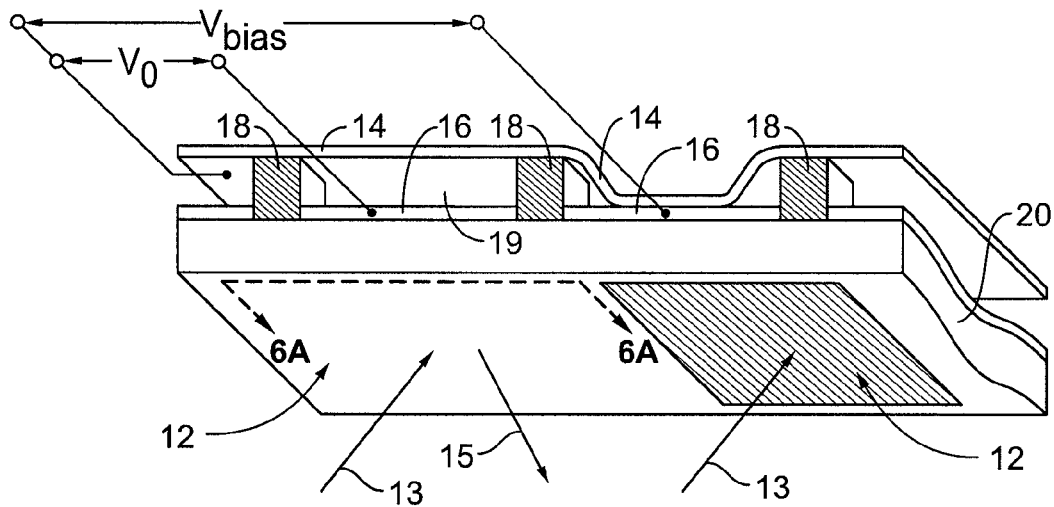
FIG. 1 shows an example of an isometric view depicting two adjacent pixels in a series of pixels of an interferometric modulator (IMOD) display device.

The following detailed description is directed to certain implementations for the purposes of describing the innovative aspects. However, the teachings herein can be applied in a multitude of different ways. The described implementations may be implemented in any device that is configured to display an image, whether in motion (e.g., video) or stationary (e.g., still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, bluetooth devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (e.g., e-readers), computer monitors, auto displays (e.g., odometer display, etc.), cockpit controls and/or displays, camera view displays (e.g., display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (e.g., MEMS and non-MEMS), aesthetic structures (e.g., display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, and electronic test equipment. Thus, the teachings are not intended to be limited to the implementations depicted solely in the Figures, but instead have wide applicability as will be readily apparent to a person having ordinary skill in the art.

Interferometric modulators can be configured such that a movable membrane can move between at least two positions. The position of the movable membrane can determine whether light is reflected from the modulator. Typically, when the movable membrane is positioned near a nonmovable electrode, light is not reflected, whereas when the movable membrane is positioned further from the nonmovable electrode, light is reflected. Some interferometric modulator implementations described herein include a dielectric stack positioned between the movable membrane and the nonmovable electrode. By controlling the refractive indices and thicknesses of layers within the dielectric stack, the states of light reflection may be reversed, such that light is reflected when the movable membrane is positioned near the nonmovable electrode.

In some implementations, a dielectric stack includes at least a first dielectric layer and a second dielectric layer positioned such that the first dielectric layer is between the nonmovable electrode and the second dielectric layer. The first dielectric layer can have a first index of refraction characteristic and the second dielectric layer can have a second index of refraction characteristic. The first index of refraction characteristic can be greater than the second index of refraction characteristic. For example, the first index of refraction characteristic can be greater than 2.1 and the second index of refraction characteristic can be less than 1.6. Further, the first dielectric layer can have a first thickness and the second dielectric layer can have a second thickness. An optical path length of the first dielectric layer through the first thickness can be about the same as an optical path length of the second dielectric layer through the second thickness.

Particular implementations of the subject matter described in this disclosure can be implemented to realize one or more of the following potential advantages. Some implementations described herein provide interferometric modulators with a dielectric stack positioned between the movable membrane and the nonmovable electrode. By controlling the refractive indices and thicknesses of layers within the dielectric stack, the states may be reversed, such that light is reflected when the movable membrane is positioned near the nonmovable electrode. As described below, this configuration can increase the brightness of the reflected light, reduce the reflectance of ambient light during the dark state, saturate the color spectra, and reduce complexity in the manufacturing of multiple-state interferometric modulators.

An example of a suitable MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows 13 indicating light incident upon the pixels 12, and light 15 reflecting from the pixel 12 on the left. Although not illustrated in detail, it will be understood by a person having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the layer(s) of the optical stack 16 can be patterned into parallel strips, and may form row electrodes in a display device as described further below. As will be understood by one having skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be on the order of 1-1000 um, while the gap 19 may be on the order of <10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the pixel 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
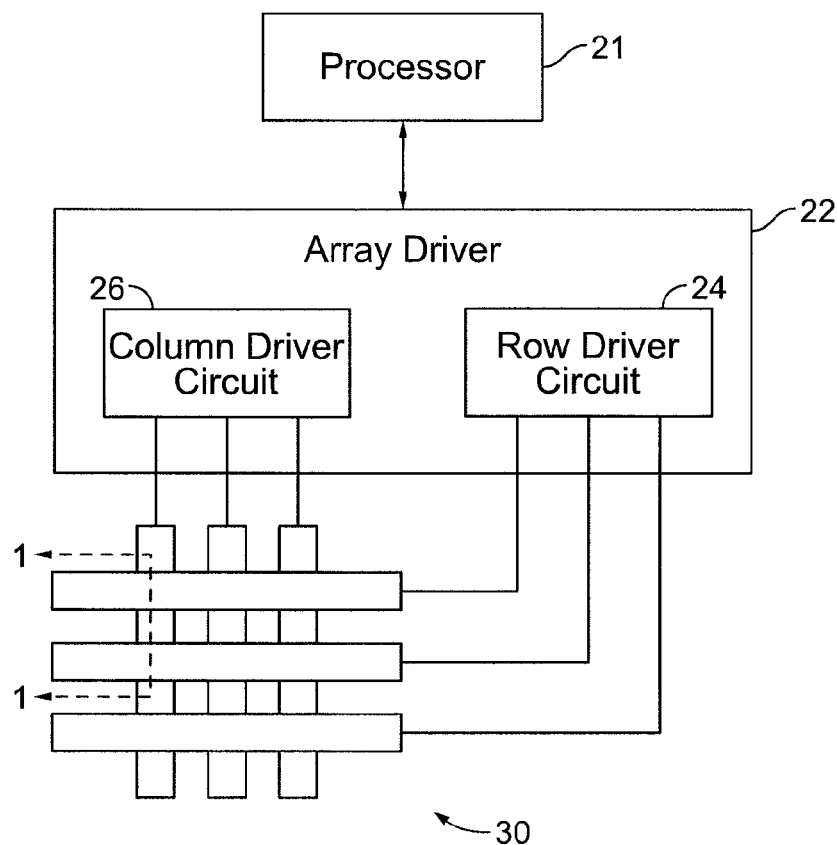
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
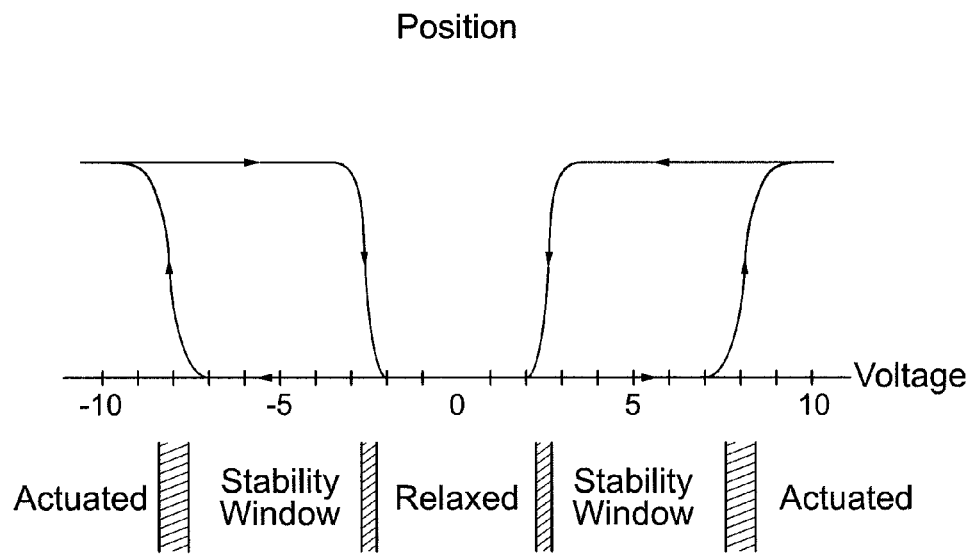
FIG. 3 shows an example of a diagram illustrating movable reflective layer position versus applied voltage for the interferometric modulator of FIG. 1.
FIG. 4 shows an example of a table illustrating various states of an interferometric modulator when various common and segment voltages are applied.

FIG. 3 shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3. An interferometric modulator may require, for example, about a 10-volt potential difference to cause the movable reflective layer, or mirror, to change from the relaxed state to the actuated state. When the voltage is reduced from that value, the movable reflective layer maintains its state as the voltage drops back below, e.g., 10-volts, however, the movable reflective layer does not relax completely until the voltage drops below 2-volts. Thus, a range of voltage, approximately 3 to 7-volts, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about 10-volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7-volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an interferometric modulator when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 5A:
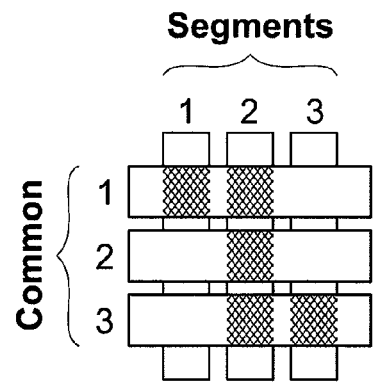
FIG. 5A shows an example of a diagram illustrating a frame of display data in the 3×3 interferometric modulator display of FIG. 2.
Figure 5B:
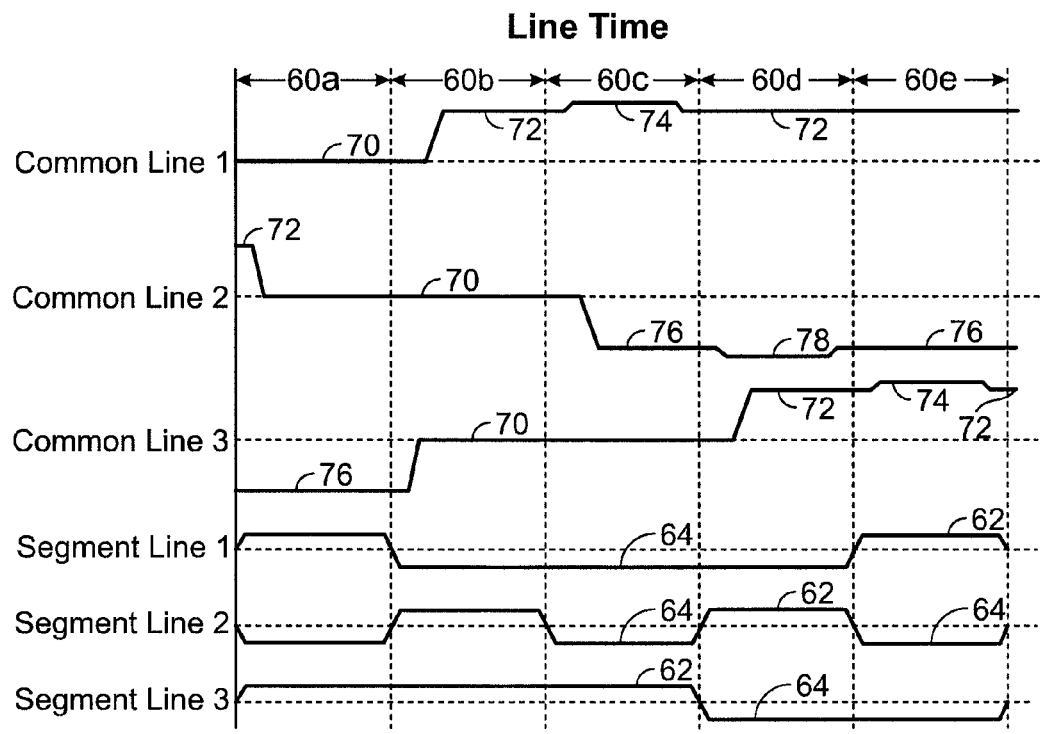
FIG. 5B shows an example of a timing diagram for common and segment signals that may be used to write the frame of display data illustrated in FIG. 5A.

FIG. 5A shows an example of a diagram illustrating a frame of display data in the 3×3 interferometric modulator display of FIG. 2. FIG. 5B shows an example of a timing diagram for common and segment signals that may be used to write the frame of display data illustrated in FIG. 5A. The signals can be applied to the, e.g., 3×3 array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, e.g., a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$—relax and $VC_{HOLD\_L}$—stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position.

Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
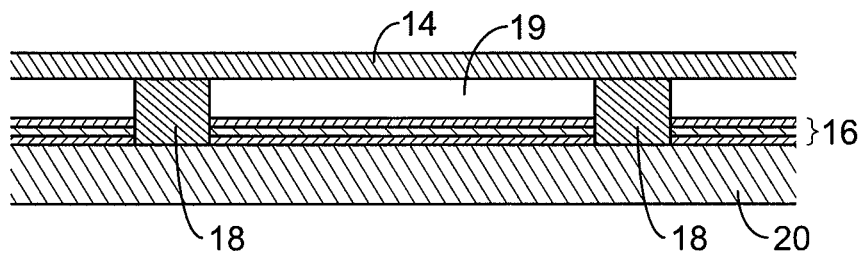
FIG. 6A shows an example of a partial cross-section of the interferometric modulator display of FIG. 1.
Figure 6B:
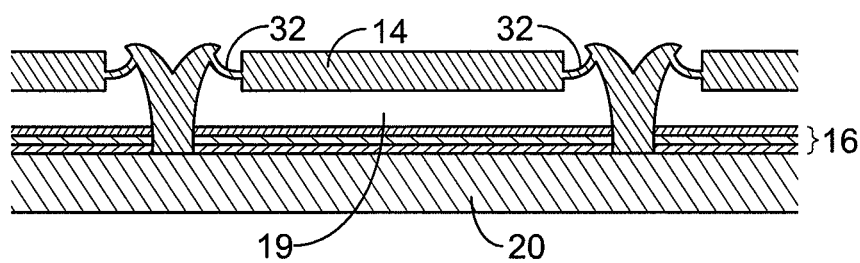
FIGS. 6B-6E show examples of cross-sections of varying implementations of interferometric modulators.
Figure 6C:
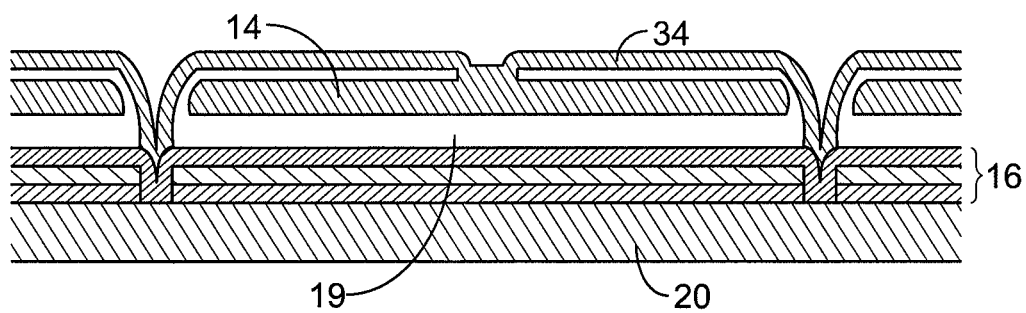

The details of the structure of interferometric modulators that operate in accordance with the principles set forth above may vary widely. For example, FIGS. 6A-6E show examples of cross-sections of varying implementations of interferometric modulators, including the movable reflective layer 14 and its supporting structures. FIG. 6A shows an example of a partial cross-section of the interferometric modulator display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
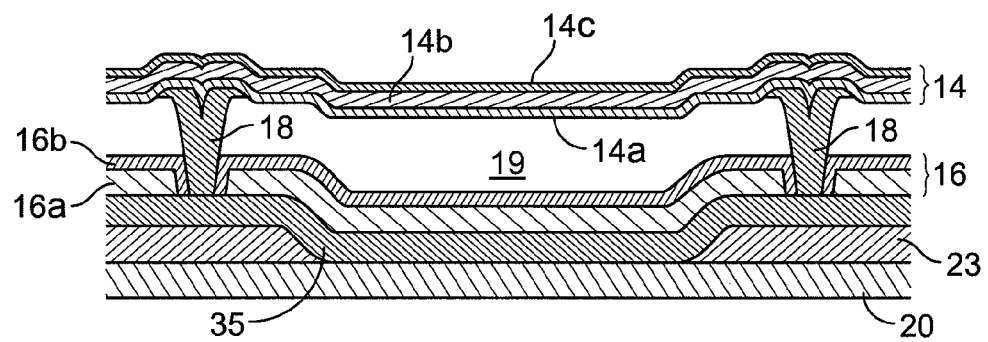

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2$/SiON/$SiO_2$ tri-layer stack. Either or both of the reflective sub-layer 14a and the conductive layer 14c can include, e.g., an aluminum (Al) alloy with about 0.5% copper (Cu), or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, carbon tetrafluoride ($CF_4$) and/or oxygen ($O_2$) for the MoCr and $SiO_2$ layers and chlorine ($Cl_2$) and/or boron trichloride ($BCl_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
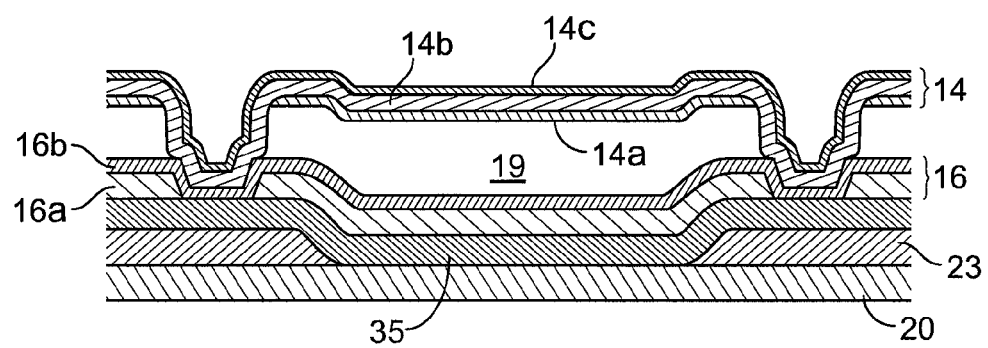

FIG. 6E shows another example of an IMOD, where the movable reflective layer 14 is self supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as, e.g., patterning.

Figure 7:
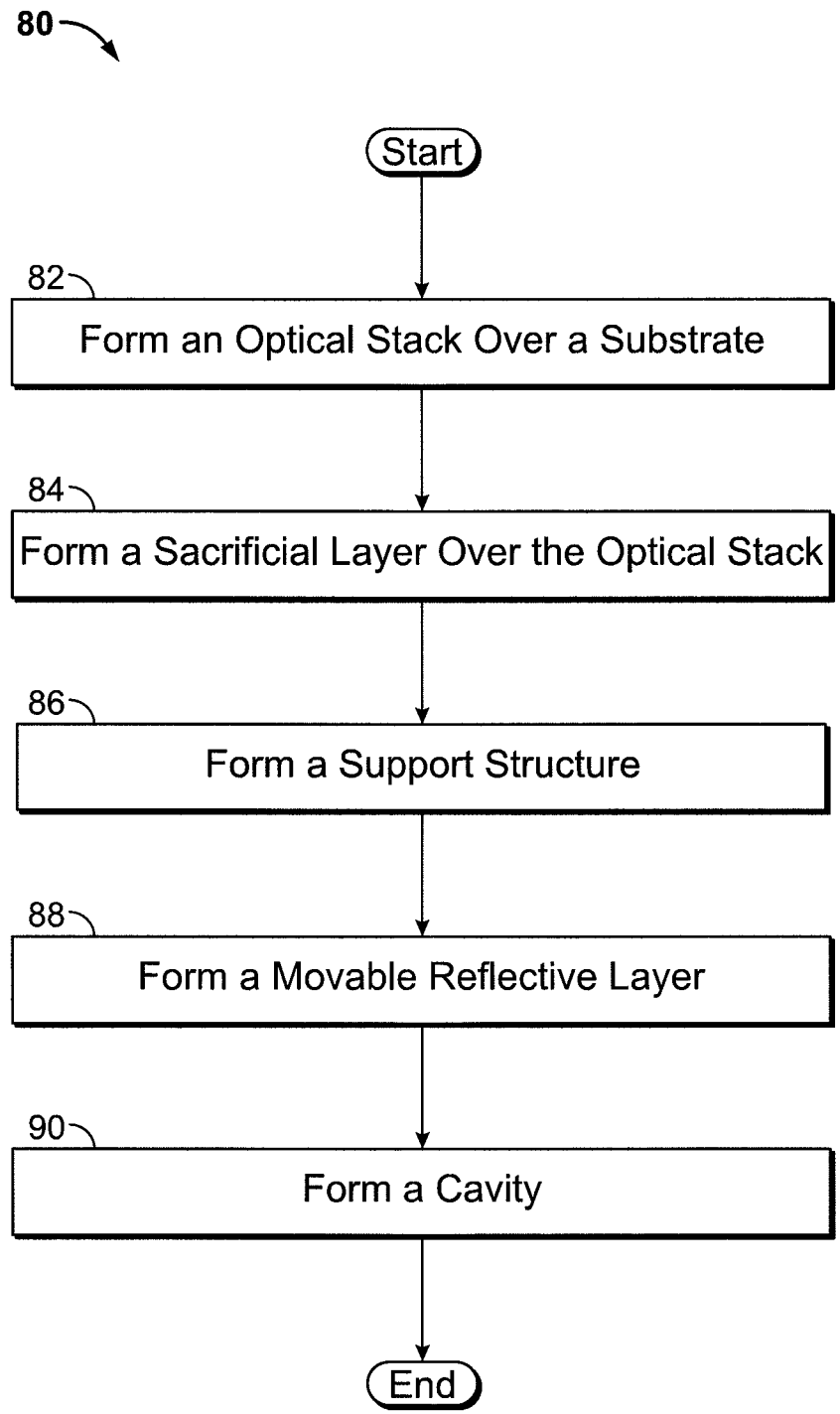
FIG. 7 shows an example of a flow diagram illustrating a manufacturing process for an interferometric modulator.
Figure 8A:
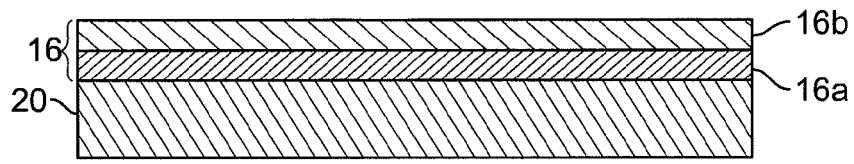
FIGS. 8A-8E show examples of cross-sectional schematic illustrations of various stages in a method of making an interferometric modulator.

FIG. 7 shows an example of a flow diagram illustrating a manufacturing process 80 for an interferometric modulator, and FIGS. 8A-8E show examples of cross-sectional schematic illustrations of corresponding stages of such a manufacturing process 80. In some implementations, the manufacturing process 80 can be implemented to manufacture, e.g., interferometric modulators of the general type illustrated in FIGS. 1 and 6, in addition to other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a, 16b can be configured with both optically absorptive and conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

Figure 8B:
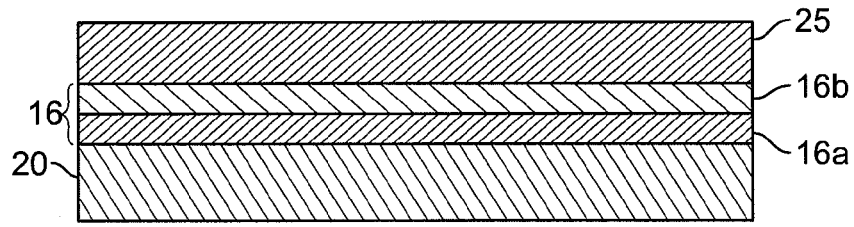

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting interferometric modulators 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (a-Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 8C:
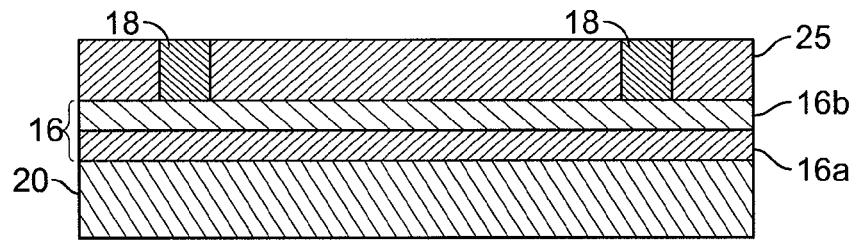

The process 80 continues at block 86 with the formation of a support structure e.g., a post 18 as illustrated in FIGS. 1, 6 and 8C. The formation of the post 18 may include patterning the sacrificial layer 25 to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
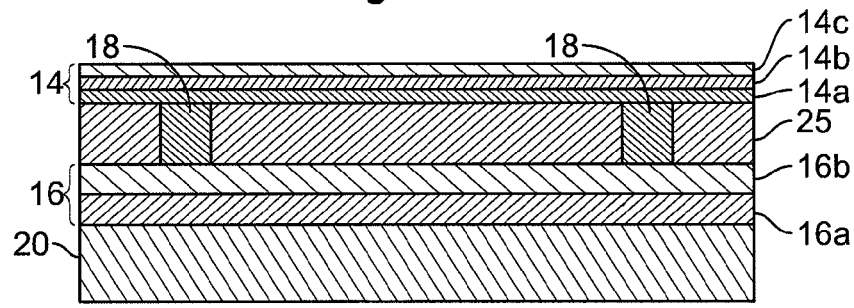
Figure 8E:
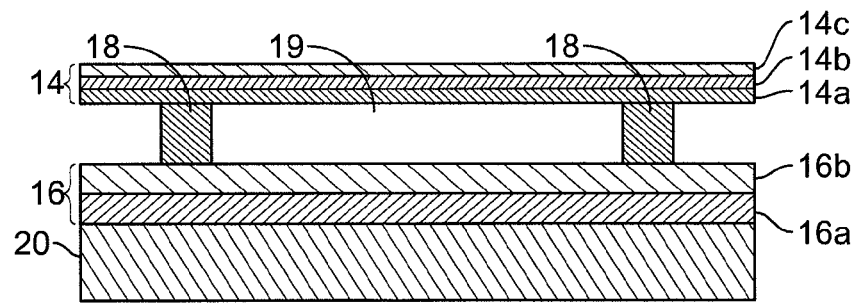

The process 80 continues at block 88 with the formation of a movable reflective layer or membrane such as the movable reflective layer 14 illustrated in FIGS. 1, 6 and 8D. The movable reflective layer 14 may be formed by employing one or more deposition steps, e.g., reflective layer (e.g., aluminum, aluminum alloy) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, 14c as shown in FIG. 8D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 also may be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 6 and 8E. The cavity 19 may be formed by exposing the sacrificial material 25 (deposited at block 84) to an etchant. For example, an etchable sacrificial material such as Mo or amorphous Si may be removed by dry chemical etching, e.g., by exposing the sacrificial layer 25 to a gaseous or vaporous etchant, such as vapors derived from solid XeF$_2$ for a period of time that is effective to remove the desired amount of material, typically selectively removed relative to the structures surrounding the cavity 19. Other etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

In some implementations, an interferometric modulator may include a dielectric stack. The dielectric stack may include multiple layers, such as two, three, four, or even more layers. As will be described in further detail below, an interferometric modulator including a dielectric stack may cause light to constructively interfere when the movable layer 14 is in the closed state (near the substrate) and light to destructively interfere when the movable layer 14 is in the open state (away from the substrate). Also, controlling the thicknesses and indices of refraction of the layers in a dielectric stack may increase the brightness of the display, reduce or eliminate the need for a black mask, increase saturation of the red and green spectra while preserving the reflectance, and/or reduce the complexity of manufacturing a multiple-state interferometric modulator.

Figure 9A:
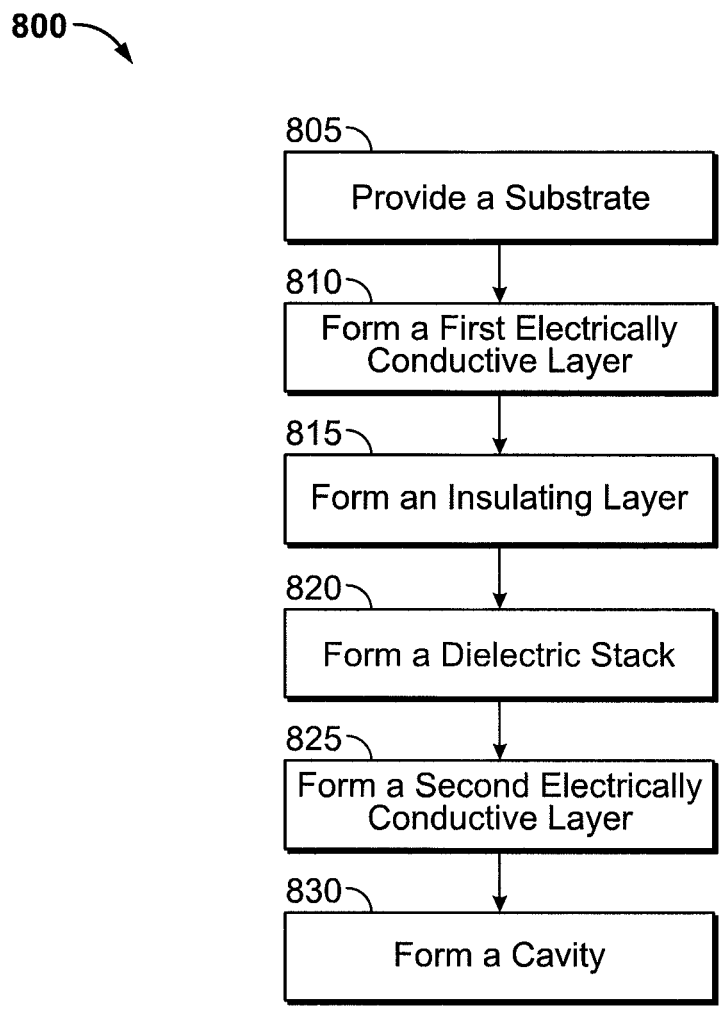
FIGS. 9A-9D show examples of processes for manufacturing an interferometric modulator including a dielectric stack.

FIG. 9A shows an example of a process for manufacturing an interferometric stack including a dielectric stack. The process 800 includes blocks which may be present in a process for manufacturing, e.g., interferometric modulators of the general type illustrated in FIGS. 10 and 12, along with other blocks not shown in FIG. 9A. Characteristics of the dielectric stack, such as thicknesses and refractive indices of the dielectric layers of the stack (e.g., an index of refraction characteristic), may be configured as described in greater detail below such that the interferometric modulator reflects light while in the closed state. Characteristics of the interferometric modulator, such as the depth of the interferometric cavity, may be configured such that the interferometric modulator reflects substantially no light while in the open state.

The process 800 begins at block 805 where a substrate 100 is provided. In some implementations, the substrate 100 may include any transparent material, for example, glass or plastic. The substrate 100 may have been subjected to prior preparation block(s), e.g., cleaning, to facilitate efficient formation of a subsequently formed layer.

The process 800 continues at block 810 with the formation of a first electrically conductive layer 105 on the substrate 100. In some implementations, the first electrically conductive layer 105 can be deposited directly on the substrate 100 and in some other implementations, one or more additional layers, for example, one or more spacer layers, may be disposed therebetween. The first electrically conductive layer 105 can be a single layer structure or can include sub-layers as described above with reference to the optical stack of FIG. 8A. The first electrically conductive layer 105 may be partially transparent and partially reflective. In a single layer structure where the first electrically conductive layer 105 functions as both an electrode and a mirror, the first electrically conductive layer 105 is formed by deposition of an electrically conductive and optically reflective material on the substrate 100. The first electrically conductive layer 105 may be formed into electrodes through subsequent patterning and etching. The first electrically conductive layer 105 may be a metal or a semiconductor (such as silicon) doped to have the desired conductivity. In some implementations, the first electrically conductive layer 105 is a multilayer structure including a transparent conductor (such as indium tin oxide or zinc oxide) and a primary mirror or partially reflective layer (such as chromium, molybdenum, vanadium, tungsten, and/or alloys of these metals). The first electrically conductive layer 105 may be patterned into parallel strips, and may form row electrodes in a display device.

The process 800 continues at block 815 with the formation of an insulating and/or oxidation inhibiting layer 110 over at least a portion of the first electrically conductive layer 105.

The oxidation inhibiting layer 110 may include materials such as silicon oxide and/or aluminum oxide. The oxidation inhibiting layer 110 serves to insulate the first electrically conductive layer 105 from an electrically conductive movable layer (e.g., movable second electrically conductive layer 130) in an interferometric modulator. The oxidation inhibiting layer 110 may be formed by known deposition methods, e.g., CVD. In some implementations, the oxidation inhibiting layer 110 is not separately formed. For example, a dielectric stack formed between the first electrically conductive layer 105 and a second electrically conductive layer 130 may include an oxidation inhibiting layer 110.

Figure 9B:
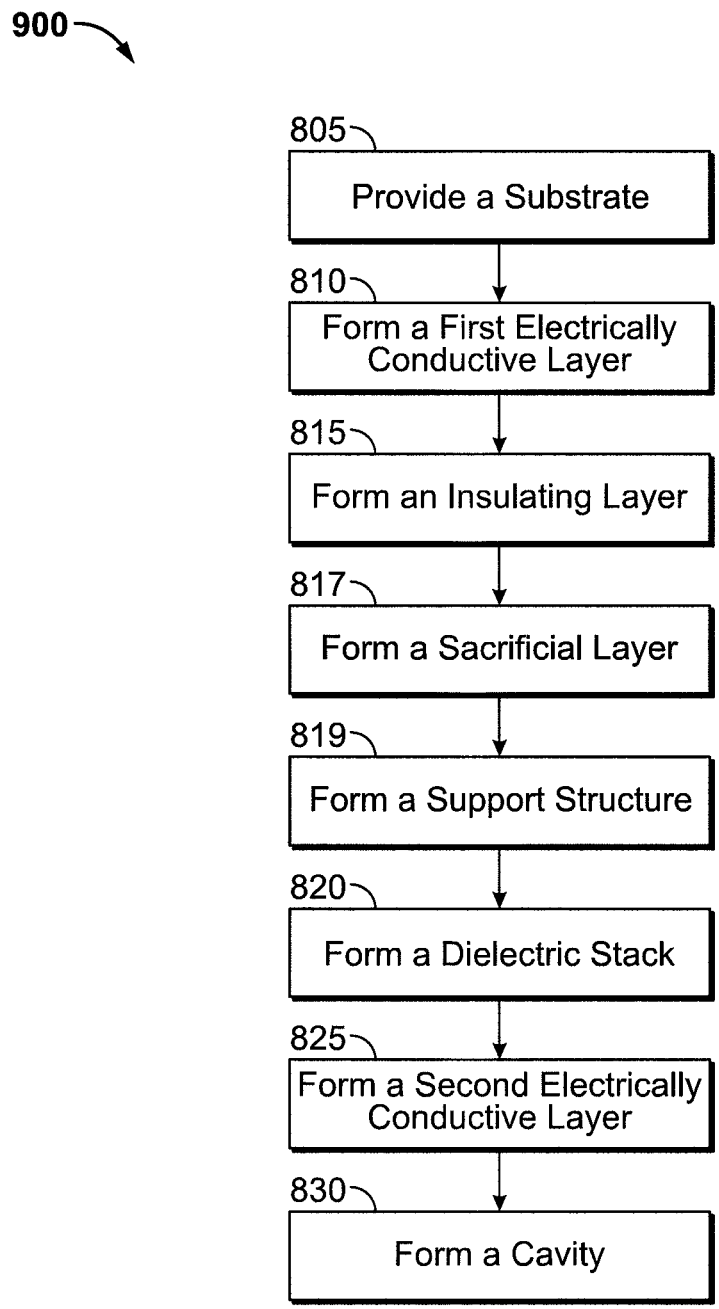

The process 800 continues at block 820 with the formation of a dielectric stack 125. The dielectric stack 125 may be formed over or on at least a portion of the oxidation inhibiting layer 110 and/or at least a portion of the first electrically conductive layer 105. As further described in connection with FIGS. 9B-12, in some implementations, the dielectric stack 125 is formed over at least a portion of a sacrificial layer 140 that is later removed, while in some other implementations, it is not. As illustrated in FIG. 10, the dielectric stack 125 may include a first layer 127a and a second layer 127b. In some implementations, the dielectric stack 125 includes more than two layers. Thus, the dielectric stack 125 may include, for example, three or four layers. Each of the layers 127a, 127b of the dielectric stack 125 may have an optical path length characteristic that is substantially equal to $\lambda*((2n+1)/4)$, where $\lambda$ is a wavelength of light and n is any integer. In some implementations, n=0 and the optical path length characteristic of each of the layers 127a, 127b is $\lambda/4$. As used herein, "optical path length" refers to the product of the geometric length of the path light flows through a layer and the index of refraction of the material which the light propagates measured in terms of the wavelength of light. In some implementations, the first layer 127a has an optical path length that is about equal to an optical path length of the second layer 127b. In some implementations, the optical path lengths of the first layer 127a and the second layer 127b are each between about $(1/8)*\lambda$ and about $(3/8)*\lambda$, or more specifically, for example, between about $(3/16)*\lambda$ and about $(5/16)*\lambda$. In some implementations, the physical thickness of the first layer 127a can range from about 20 nm to about 100 nm and the physical thickness of the second layer 127b can range from about 20 nm to about 100 nm. $\lambda$ may be a wavelength of visible light and/or a wavelength between about 380 and about 740 nm. In some implementations, each of the layers 127a, 127b of the dielectric stack 125 may be of the same or of different thicknesses and/or optical path lengths than other layers of the dielectric stack 125.

In some implementations, the formation of the dielectric stack 125 includes forming a first dielectric layer 127a and forming a second dielectric layer 127b over the first dielectric layer 127a. In some implementations, the refractive index of the first dielectric layer 127a may be greater than the refractive index of the second dielectric layer 127b, or vice versa in some other implementations. For example, the refractive index of the first dielectric layer 127a may be greater than or equal to about 2.0. The extinction coefficient characteristic of the first dielectric layer 127a may be less than or equal to about 0.5. The refractive index of the second dielectric layer 127b may be less than or equal to about 2.0. In some implementations, the refractive index of the first dielectric layer 127a is greater than about 2.1 and the refractive index of the second dielectric layer 127b is less than about 1.6. The first dielectric layer 127a may include, for example, zirconium dioxide ($ZrO_2$), titanium dioxide ($TiO_2$), silicon carbide (SiC), gallium phosphide (GaP), silicon (Si), hafnium dioxide ($HfO_2$), gallium nitride (GaN), or indium phosphide (InP), and/or any combination thereof. The second dielectric layer 127b may include, for example, magnesium fluoride ($MgF_2$) or silicon dioxide ($SiO_2$), in addition to other dielectric materials. The dielectric stack 125 may include subsequent layers, such as a third and a fourth dielectric layer. Subsequent layers may be formed such that the refractive indices of the layers within the dielectric stack 125 alternate between high and low indices. In some implementations, the first and third dielectric layers may include the same material(s), whereas in some other implementations, they do not. Similarly, in some implementations, the second and fourth dielectric layers may include the same material/s, whereas in some other implementations, they do not.

The process 800 continues at block 825 with the formation of a second electrically conductive layer 130, also known as a movable conductive layer, over the dielectric stack 125. In some implementations, at least part of the second electrically conductive layer 130 is formed on at least part of a sacrificial layer 140 that is later removed. In some implementations, the second electrically conductive layer 130 includes a movable layer, such as the movable layer 14 of an interferometric modulator as shown in FIG. 1. In some implementations, due to the presence of a sacrificial layer 140 at this stage of the process 800, the second electrically conductive layer 130 may not yet be movable. The second electrically conductive layer 130 may include a metal (e.g. aluminum, aluminum alloy, silver, or silver alloy). Forming the second electrically conductive layer 130 in block 825 may include one or more deposition blocks as well as one or more patterning or masking blocks.

The process 800 continues at block 830 with the formation of a cavity or air gap 115. As further described in connection with FIGS. 9B-12, the formation of the cavity may include the removal (e.g., by etching) of a sacrificial layer 140. The removal of a sacrificial layer 140 can be accomplished, for example, by exposure to an etchant such as $XeF_2$, $F_2$, or HF alone or in combination. In some implementations, substantially all of the sacrificial layer 140 is removed in the etching process. The cavity 115 may be formed between the oxidation inhibiting layer 110 and the dielectric stack 125. However, in some implementations, the cavity 115 can be formed between the dielectric stack 125 and the second electrically conductive layer 130.

In some implementations, the dielectric stack 125 is positioned over the cavity 115. FIG. 9B shows an example of a process for manufacturing an interferometric stack including a dielectric stack. The process 900 includes additional blocks 817 and 819 which have been added to the manufacturing process 800 illustrated FIG. 9A. Blocks 805, 810 and 815 are as described in connection with FIG. 9A. The process 900 then continues at block 817 with the formation of a sacrificial layer 140. The sacrificial layer 140 may be formed on or over the oxidation inhibiting layer 110. The sacrificial layer 140 may include a material etchable by $XeF_2$, such as molybdenum or silicon. Deposition methods such as CVD, sputtering or spin coating may be used in forming the sacrificial layer 140. The sacrificial layer 140 may be patterned and etched to, for example, form one or more support structure apertures. Support structure apertures may extend through the sacrificial layer 140. Support structure apertures may additionally extend through the oxidation inhibiting layer 110 and/or the first electrically conductive layer 105. At block 819, support structure material is deposited into the apertures forming support structures 120. The support structures 120 may include a non-conductive material, such as silicon dioxide or silicon oxynitride. One or more support structures 120 can support the second electrically conductive layer 130 and/or the dielectric stack 125, thereby forming an air gap or a cavity 115. In some implementations, the support structures 120 are formed prior to the formation of the sacrificial layer 140. Blocks 820, 825, and 830 are substantially as described in connection with FIG. 9A. At block 820, the dielectric stack 125 may be formed over or on the sacrificial layer 140 formed in block 817 and/or over or on the support structures 120. At block 825, the second electrically conductive layer 130 may be formed over or on the dielectric stack 125 and/or over or on the support structures 120. At block 830, a cavity 115 may be formed by removing the sacrificial layer 140 formed in block 817.

Figure 9C:
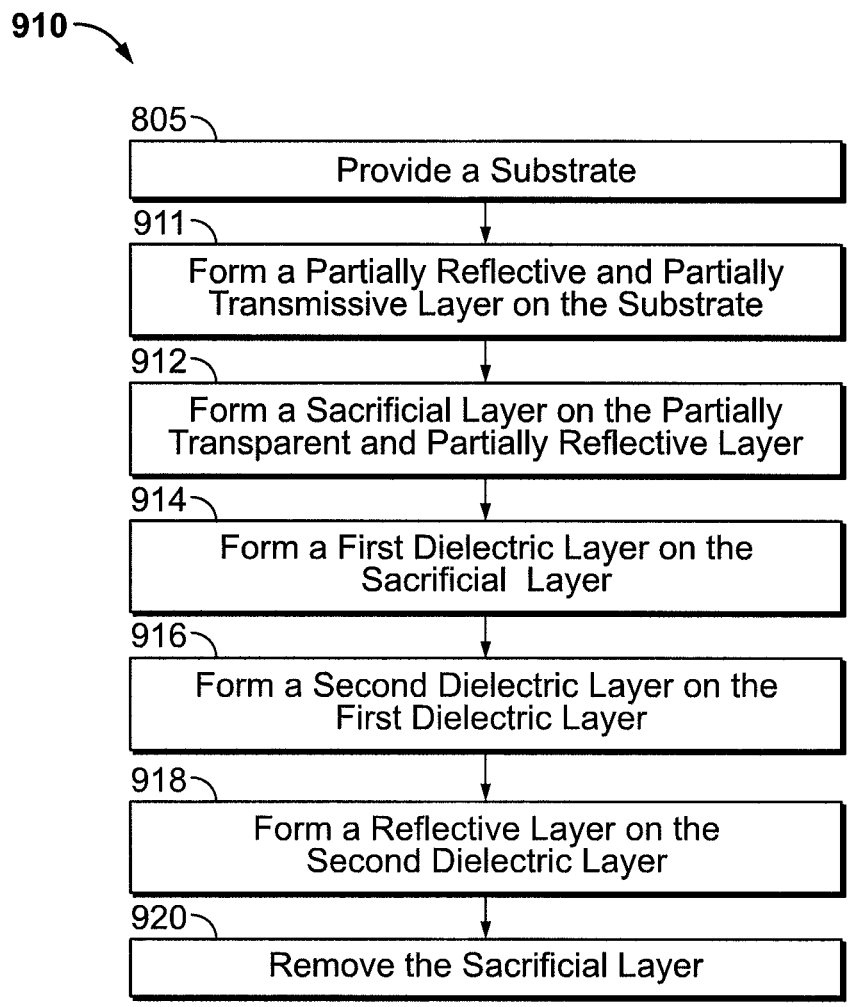
Figure 10:
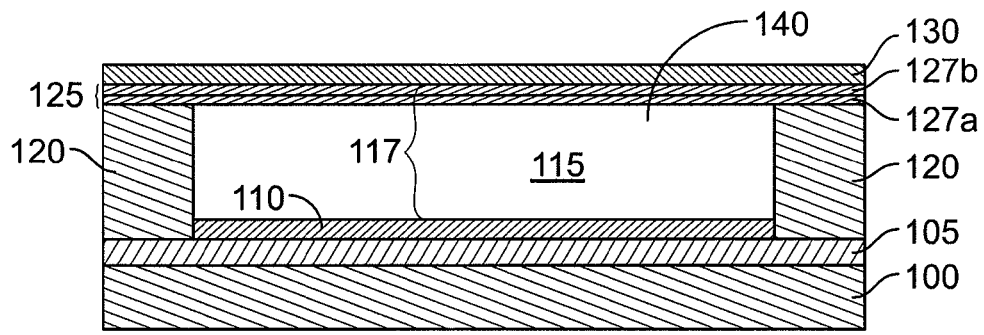
FIG. 10 shows an example of an interferometric modulator including a dielectric stack.

FIG. 9C shows an example of a process for manufacturing an interferometric stack including a dielectric stack. The process 910 begins at block 805 where a substrate is provided. The process 910 continues at block 911 with the formation of a partially reflective and partially transmissive layer on the substrate. The partially reflective and partially transmissive layer can be a single layer structure or a multiple sub-layer structure similar to the first electrically conductive layer 105 described above. The process 910 continues at block 912 with the formation of a sacrificial layer on the partially transparent and partially reflective layer. The sacrificial layer can be similar to the sacrificial layer 140 described above with reference to FIG. 10.

As shown in block 914, the process 910 also can include forming a first dielectric layer on the sacrificial layer. The first dielectric layer can have a first thickness and a first index of refraction characteristic. The process 910 continues at block 916 with the formation of a second dielectric layer on the first dielectric layer. The second dielectric layer can have a second thickness and a second index of refraction characteristic. Further, the second dielectric layer can be formed such that an optical path length of the first dielectric layer through the first thickness is about the same as an optical path length of the second dielectric layer through the second thickness. As used herein, "about the same" can refer to optical path lengths that are between 80% and 120% of given optical path length, for example, two optical path lengths can be about the same if they are each between 90% and 110% of a given optical path length. Also, the second dielectric layer can be formed such that the first index of refraction characteristic is greater than the second index of refraction characteristic. Together, the first and second dielectric layers can form a dielectric stack similar to the dielectric stack 125 discussed with reference to FIG. 10. As shown in block 918, the process 910 also can include forming a reflective layer on the second dielectric layer. In some implementations, the reflective layer can be similar to the second electrically conductive layer 130 discussed with reference to FIG. 10. The process 910 continues with the removal of the sacrificial layer as shown in block 920. The sacrificial layer can be removed, for example, by exposure to an etchant such as $XeF_2$, $F_2$, or HF alone or in combination.

Figure 9D:
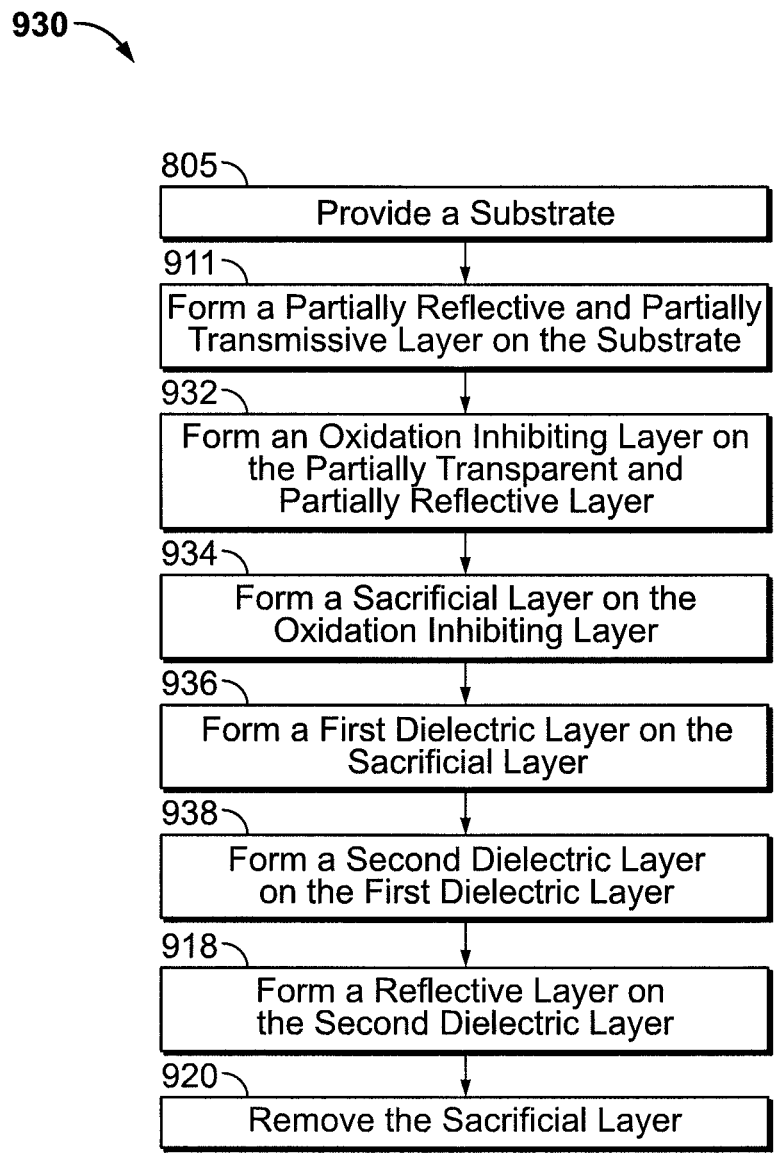

FIG. 9D shows an example of a process for manufacturing an interferometric stack including a dielectric stack. Blocks 805, 911, 918, and 920 are substantially as described in FIG. 9C. At block 932, an oxidation inhibiting layer may be formed on the partially transparent and partially reflective layer. The oxidation inhibiting layer may include materials such as silicon oxide and/or aluminum oxide. As shown in block 934, the process 910 may include forming a sacrificial layer on the oxidation inhibiting layer. The sacrificial layer can be similar to the sacrificial layer 140 described above with reference to FIG. 10. The process continues at block 936 with the formation of a first dielectric layer on the sacrificial layer. The first dielectric layer can have an index of refraction characteristic that is greater than 2.1. As shown by block 938, the process 910 also can include forming a second dielectric layer on the first dielectric layer. The second dielectric layer can have an index of refraction characteristic that is less than 1.6. Together, the first and second dielectric layers can form a dielectric stack similar to the dielectric stack 125 discussed with reference to FIG. 10.

FIG. 10 shows an example of an interferometric modulator including a dielectric stack. As shown in FIG. 10, the cavity 115 may be formed between the dielectric stack 125 and the oxidation inhibiting layer 110 or between the dielectric stack 125 and the first electrically conductive layer 105. An optically resonant cavity 117 can be defined between the second electrically conductive layer 130 and the first electrically conductive layer 105 and can include optically resonant materials such as air in the cavity 115 and the dielectric stack 125. Thus, the example interferometric modulator of FIG. 10 includes an optically resonant cavity 117 and an air gap disposed in the optical resonant cavity 117. In some implementations, the optically resonant cavity 117 can be defined between the second electrically conductive layer 130 and the first electrically conductive layer 105. In some other implementations, the optically resonant cavity 117 can be defined between the second electrically conductive layer 130 and the insulating and/or oxidation inhibiting layer 110.

Figure 11:
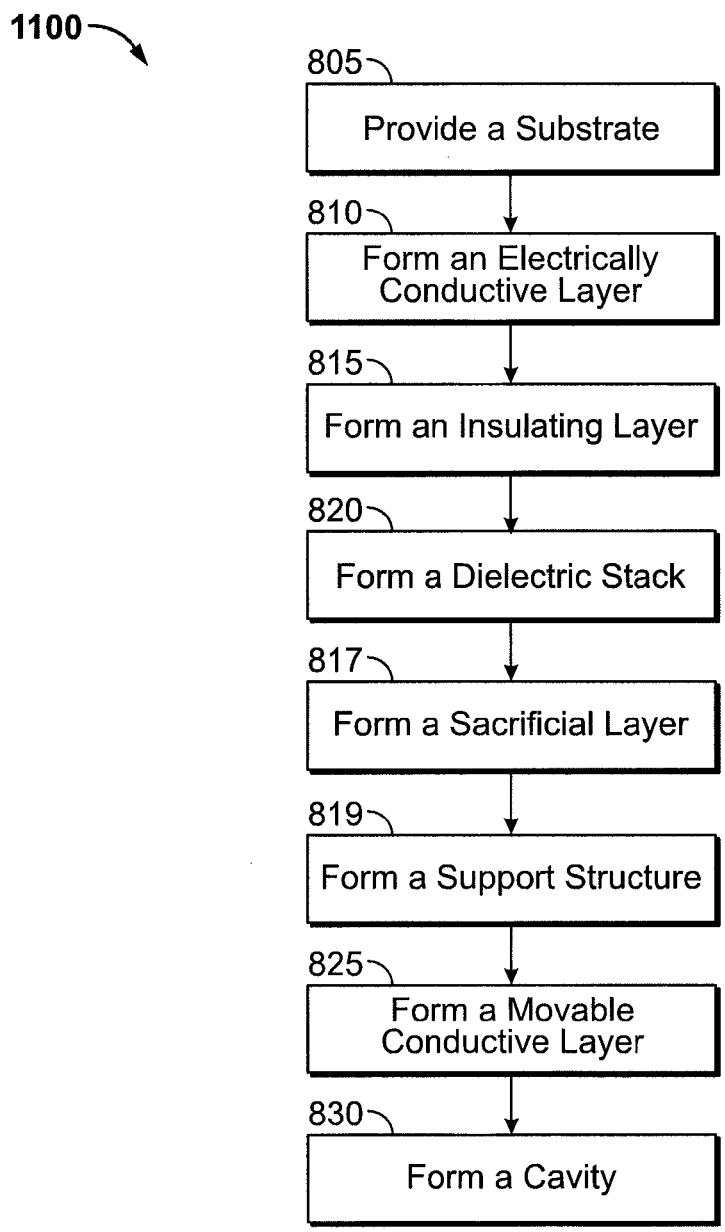
FIG. 11 shows an example of a process for manufacturing an interferometric modulator including a dielectric stack.
Figure 12:
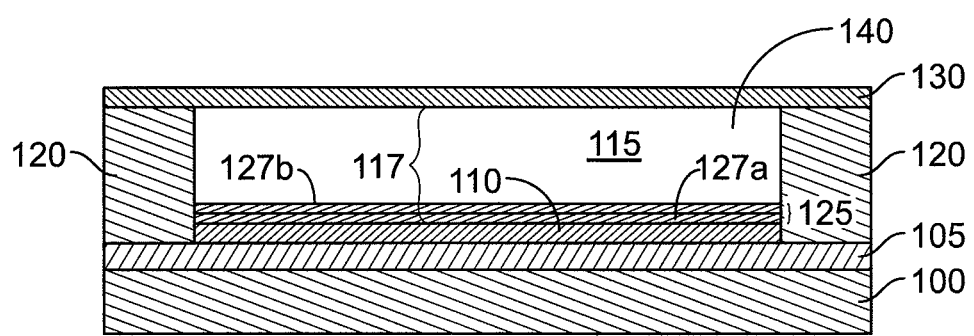
FIG. 12 shows an example of an interferometric modulator including a dielectric stack.

In some implementations, the dielectric stack 125 is positioned below a cavity 115. FIG. 11 shows an example of a process for manufacturing an interferometric modulator including a dielectric stack. The process 1100 includes additional blocks 817 and 819 which have been added to the manufacturing process 800 of FIG. 9A. Blocks 805, 810, 815 and 820 are as described in connection with FIG. 9A. At block 820, the dielectric stack 125 is formed on or over the oxidation inhibiting layer and/or is formed on or over the first electrically conductive layer 105. The process 900 then continues at block 817 with the formation of a sacrificial layer 140. The sacrificial layer may 140 be formed on or over the dielectric stack 125. The sacrificial layer 140 may include a material etchable by $XeF_2$, e.g., molybdenum. Deposition methods such as CVD, sputtering or spin coating may be used in forming the sacrificial layer 140. The sacrificial layer 140 may be patterned and etched to, for example, form one or more support structure apertures. Support structure apertures may extend through the sacrificial layer 140. Support structure apertures may additionally extend through the dielectric stack 125, oxidation inhibiting layer 110 and/or the first electrically conductive layer 105. At block 819, support structure material is deposited into the apertures forming support structures 120. The support structures 120 may include a non-conductive material. One or more support structures 120 can support the second electrically conductive layer 130, thereby forming a gap or a cavity 120. Blocks 825 and 830 are substantially as described in connection with FIG. 9A. At block 825, the second electrically conductive layer 130 may be formed over or on the sacrificial layer 140 and/or over or on the support structures 120. At block 830, a cavity 115 may be formed by removing the sacrificial layer 140 formed in block 817. FIG. 12 shows an example of an interferometric modulator including a dielectric stack. The implementation shown in FIG. 12 is an alternative to the implementation shown in FIG. 10 and includes a dielectric stack 125 disposed on the oxidation inhibiting layer 110 with an air gap 115 defined between the dielectric stack 130 and the second electrically conductive layer 130. As discussed below with reference to FIG. 13C, such a configuration may enable light to constructively interfere while the second electrically conductive layer 130 is in the closed state. In the implementation shown in FIG. 12, the cavity 115 can include a thickness measured between the dielectric stack and the electrically conductive layer 130. In some implementations, the thickness of the cavity 115 is between about 0 nm and about 1000 nm.

Figure 13A:
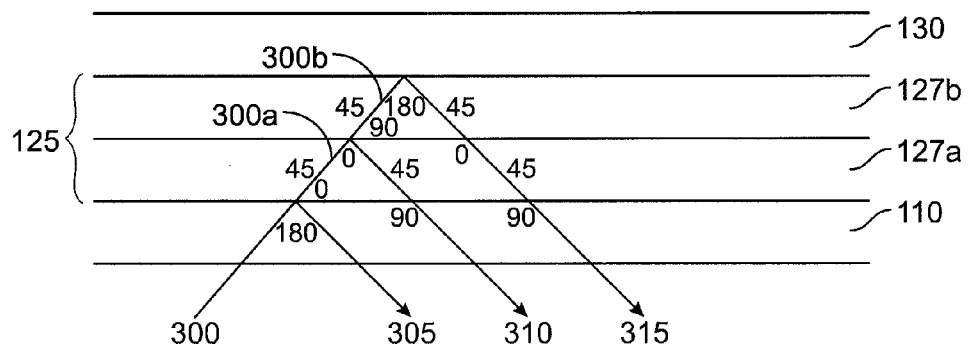
FIGS. 13A-13C show examples of reflection diagrams for light reflected at interfaces of layers of an interferometric modulator.
Figure 13B:
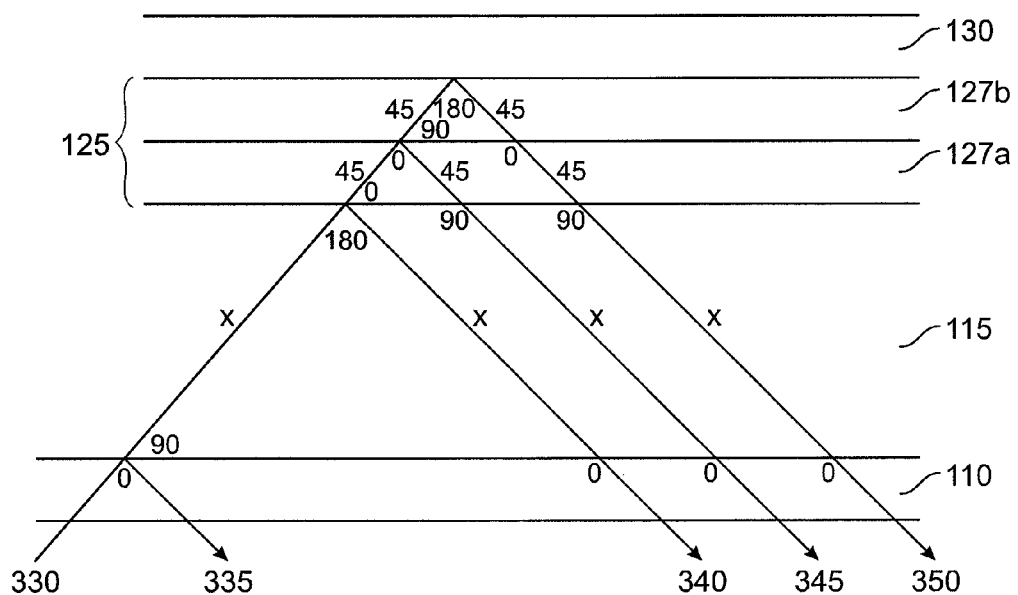
Figure 13C:
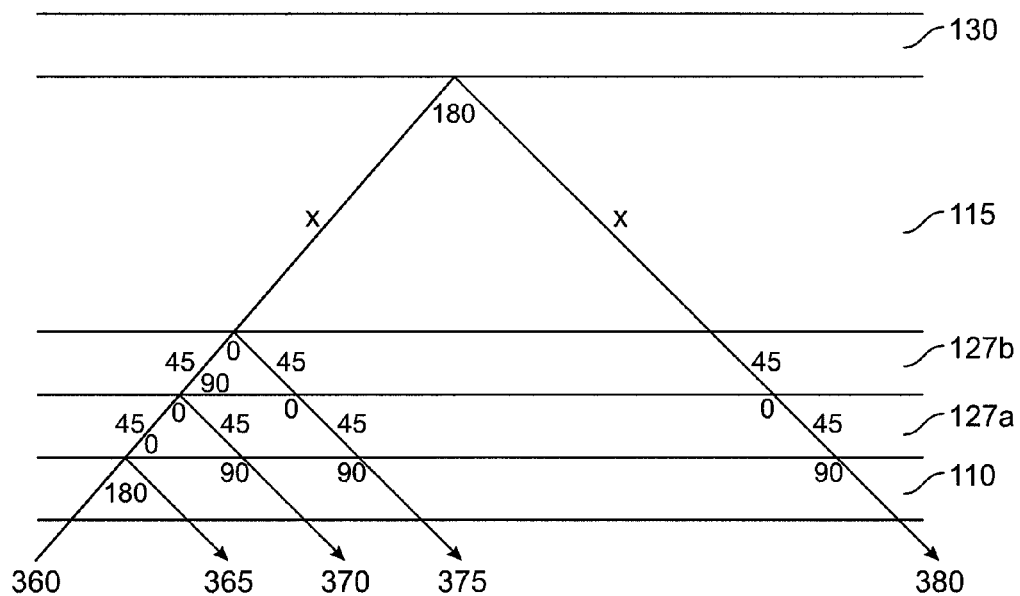

The optical path lengths and refractive indices can determine whether light will constructively or destructively interfere while the interferometric is in one or more states. FIGS. 13A-13C show examples of reflection diagrams for light reflected at interfaces of layers of an interferometric modulator. As described below, in these examples, constructive interference occurring during the closed state causes light to be reflected by the device. Meanwhile, destructive interference occurring during the open state can cause substantially no light to be reflected by the device. In the illustrations of FIGS. 13A-13C, the refractive index of the first dielectric layer 127a is greater than that of the oxidation inhibiting layer 110, of the medium in the cavity 115, and of the second dielectric layer 127b, and the refractive index of the second dielectric layer 127b is less than that of the second electrically conductive layer 130 and greater than that of the medium in the cavity 115. The optical path lengths of the first and second dielectric layers are equal to approximately $\lambda*((2n+1)/4)$, and the thickness of the cavity may be appropriately configured as described below. A person having ordinary skill in the art will readily understand that in instances in which the relations between the refractive indices of the layers are not as described above, the thicknesses and/or optical path lengths of the layers may be appropriately adjusted to produce the desired interference based upon the optical properties described below.

FIG. 13A shows an example of a reflection diagram for light reflected at the interfaces of layers of an interferometric modulator while the modulator is in the closed state. In this state, the second electrically conductive layer 130 is positioned closer to the substrate than in the open state. In FIG. 13A, the second electrically conductive layer 130 is positioned on the second dielectric layer 127b, which is positioned on the first dielectric layer 127a, which is positioned near or on the insulating and/or oxidation inhibiting layer 110.

For illustrative purposes, the incident light wave 300 and reflected light waves 305, 310 and 315 are drawn at an angle to distinguish each of the waves. When the incident light wave 300 travels from the oxidation inhibiting layer 110 to the surface of the first dielectric layer 127a, part of the incident light wave 300 is reflected as light wave 305 while the remainder is refracted as light wave 300a it enters the first dielectric layer 127a. Since the refractive index of the first dielectric layer 127a is greater than the refractive index of the oxidation inhibiting layer 110, the reflected light wave 305 undergoes an 180° phase change. The transmitted light wave 300a does not undergo a phase change at the interface. However, because the thickness of the first dielectric layer can be approximately $\lambda*((2n+1)/4)$, the phase changes 45° while traveling through the layer.

At the interface between the first dielectric layer 127a and the second dielectric layer 127b, part of the light wave 300a is reflected as reflected light wave 310, while the remainder is refracted as light wave 300b as it enters the second dielectric layer 127b. Since the refractive index of the second dielectric layer 127b is less than the refractive index of the first dielectric layer 127a, there is no phase change for reflected light wave 310 at the interface between the dielectric layers 127a and 127b. However, the light again travels through the first dielectric layer 127a, so another 45° phase change occurs. When the reflected light wave 310 encounters the oxidation inhibiting layer 110 of a lower refractive index than the first dielectric layer, a 90° phase change occurs. The transmitted light wave 300b similarly undergoes a 90° phase change at the interface between the dielectric layers 127a and 127b, since the second dielectric layer 127b has a lower refractive index than the first dielectric layer. Again, because the thickness of the first dielectric layer is approximately $\lambda*((2n+1)/4)$, the phase changes 45° while traveling through the second dielectric layer 127b.

At the interface between the second dielectric layer 127b and the second electrically conductive layer 130, the reflected light wave 315 undergoes a 180° phase change since the refractive index of the second dielectric layer 127b is less than the refractive index of the second electrically conductive layer 130. A further 90° phase change occurs as it travels through both of the dielectric layers 127a and 127b due to the thickness of the layers. Yet another 90° phase change occurs as the wave 315 is transmitted through the interface between the first dielectric layer 127a and the oxidation inhibiting layer 110, as explained above for light wave 310.

Therefore, (without including phase changes due to traveling through layers below the dielectric layers) reflected light wave 305 undergoes a total 180° of phase changes, reflected light wave 310 undergoes 180° of phase changes, and reflected light wave 315 undergoes 520° of phase changes (which is equivalent to 180° of phase changes). Thus, all of the reflected light waves 305, 310 and 315 can constructively interfere. In some implementations, when the interferometric modulator is in the closed state, the modulator appears dark or black.

Using the same optics principles, FIG. 13B shows an example of the phase changes that would occur at interfaces present when the interferometric modulator of FIG. 10 is in the open configuration. Total phase changes (again not including those due to traveling through layers below the cavity 115) for the reflected light waves 335, 340, 345 and 350 are equal to 0°, 2X+270°, 2X+270°, 2X+270°. The phase change X will be dependent upon the thickness of the cavity 115. Thus, by properly configuring the thickness of the cavity 115, the reflected light waves 340, 345 and 350 can destructively interfere with reflected light wave 335. In some implementations, the thickness of the cavity 115 is equal to about 150 nm and the interferometric modulator reflects a generally white color. In some other implementations, the thickness of the cavity 115 is greater than about 150 nm and the interferometric modulator reflects light having a color different than white, for example, red, green, blue, or yellow.

FIG. 13C shows an example of the phase changes that would occur at interfaces present when the interferometric modulator of FIG. 12 is in the open configuration. Total phase changes (again not including those due to traveling through layers below the dielectric layers 127a and 127b) for the reflected light waves 365, 370, 375 and 380 are equal to 180°, 2X+180°, 2X+360°, 2X+180°. Thus, by properly configuring the thickness of the cavity 115, the light waves 365, 370, 375 and 380 can destructively interfere with each other.

The refractive indices of the layers of the dielectric stack 125 may alternate between high and low refractive indices. The bottom layer of the dielectric stack 125 may have a high refractive index. Such a configuration may enable light to continue to constructively interfere while the interferometric modulator is in the closed state, as shown in FIG. 13A.

In some implementations, a multiple-state interferometric modulator may be configured such that the second electrically conductive layer 130 can move between three or more states. The dielectric stack 125 may enable light of a first wavelength to be reflected during the closed state. The thickness of a cavity 115 between the two electrically conductive layers may be configured in one of the other states such that light of a second wavelength is reflected in one of the open states. Multiple-state interferometric modulators as described may be easier to fabricate than other interferometric modulators that depend on thin oxide films (<5 nm) between the first electrically conductive layer 105 and the oxidation inhibiting layer 110. These other interferometric modulators may be difficult to fabricate since etchants such as $XeF_2$ can etch the oxidation inhibiting layer 110 through pinholes in the thin oxide film, and the thin oxide film may lead to changing the oxidation inhibiting layer 110 or dielectric breakdown.

The presence of the dielectric stack 125 below the second electrically conductive layer 130 may increase the reflectance of the second electrically conductive layer 130 during the closed state and cause a 0 degree phase change associated with the layer 130 rather than a 180 degree phase change. Therefore, the closed state may be associated with a black color instead of a white (or colored) color.

EXAMPLES

Example 1

Figure 14:
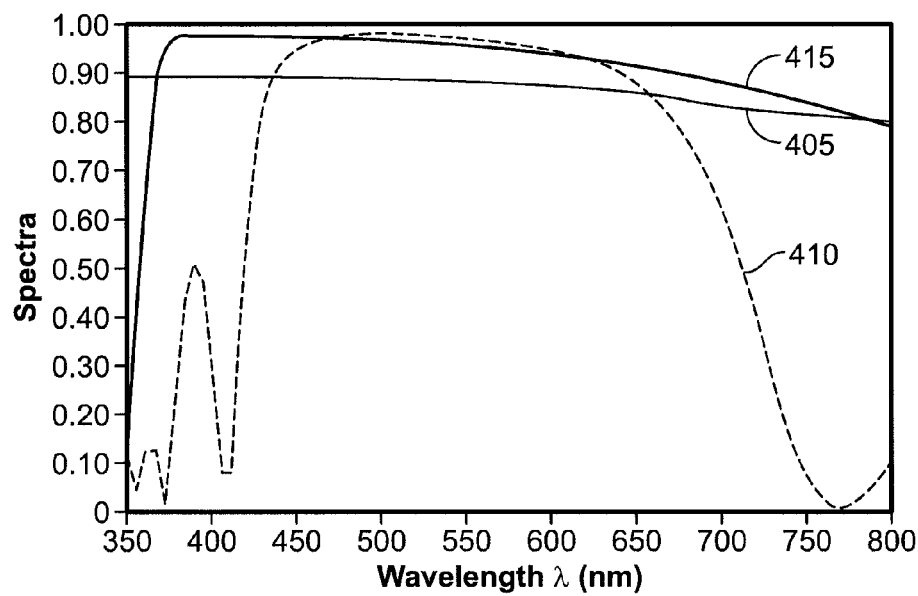
FIG. 14 shows an example of a reflectance spectra for aluminum, dielectric-enhanced aluminum, and dielectric layers.

The reflectance associated with a layer was calculated using a computer simulation. The reflectance was calculated for layers respectively composed of (1) only aluminum (spectra 405); (2) a dielectric stack (spectra 410); and (3) a dielectric stack on the aluminum (spectra 415). In these calculations, the dielectric stack included layers of alternating refractive indices. The thickness of the layers were equal to about $\lambda*((2n+1)/4)$, where $\lambda$ is 550 nm. FIG. 14 shows an example of a reflectance spectra for aluminum, dielectric-enhanced aluminum, and dielectric layers. The example includes the reflectance spectra 405, 410 and 415 for each layer. The aluminum layer is characterized by a moderately high reflectance across most of the characterized wavelengths. The dielectric stack was associated with a higher reflectance than the aluminum layer but only for a subset of the wavelengths. The reflectance was substantially below the reflectance of the aluminum layer for the remaining wavelengths. The dielectric enhanced aluminum provides higher reflectance than the aluminum layer across the majority of the wavelengths.

Example 2

Figure 15A:
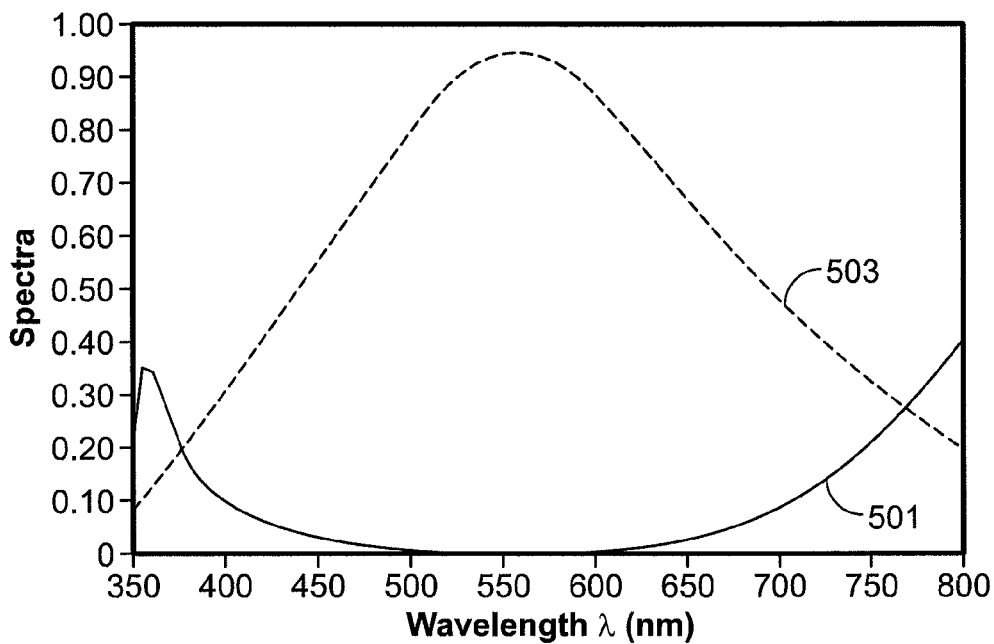
FIGS. 15A and 15B show examples of reflectance spectra for interferometric modulators in the dark and bright state.
Figure 15B:
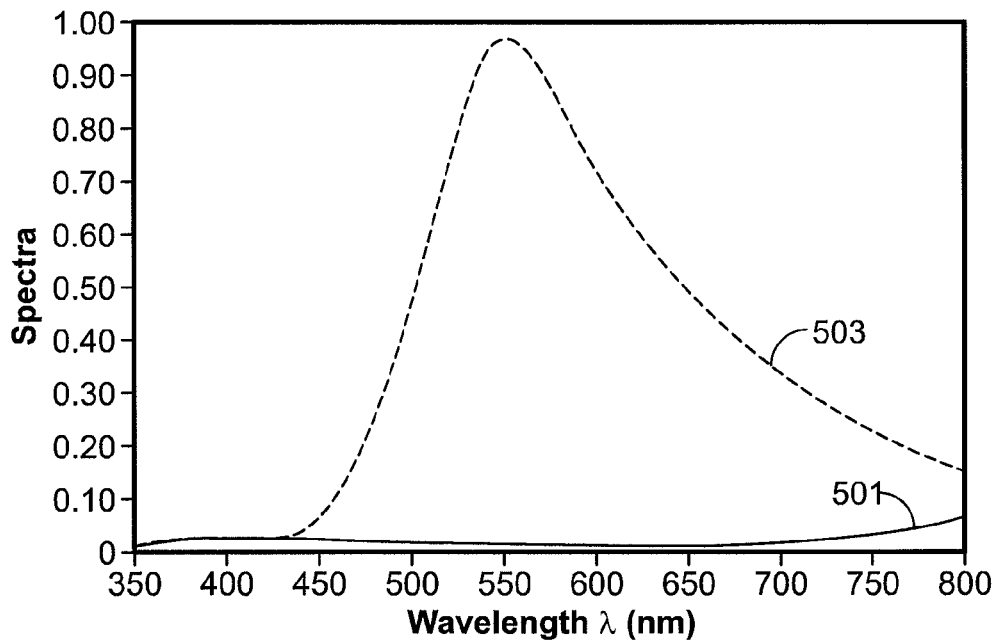

Using a computer simulation, the reflectance of an interferometric modulator was calculated for both the dark (open) and light (closed) state. In the first instance, the reflectance was calculated for an interferometric modulator with a dielectric stack positioned below the second electrically conductive layer. The dielectric stack included layers of alternating refractive indices. The thickness of the layers were equal to about $\lambda*((2n+1)/4)$, where $\lambda$ is 550 nm. FIG. 15A shows an example of reflectance spectra for an interferometric modulator in the dark and bright state. The example includes the reflectance 501 as a function of wavelength when the interferometric modulator is in the dark state and the reflectance 503 as a function of wavelength when the interferometric modulator is in the bright state. FIG. 15B shows an example of reflectance spectra for an interferometric modulator in the dark and bright state. The example includes the reflectance for the dark 501 and bright 503 states for an interferometric modulator having a pixel with a dielectric on the absorber as the second electrically conductive electrodes, wherein the dielectric stack is not coupled to the mirror. Comparing FIGS. 15A and 15B, the reflectance during the dark state for wavelengths around 550 nm is lower for the dielectric enhanced mirror (of FIG. 15A) than for the pixel with a dielectric on the absorber (of FIG. 15B). The reflectance during the bright state for wavelengths around $\lambda$ is higher for the dielectric enhanced mirror than for the pixel with a dielectric on the absorber. Thus, the dielectric enhanced mirror can provide increased contrast as compared to the pixel with a dielectric on the absorber.

Example 3

Using a computer simulation, the reflectance of an RGBY interferometric modulator pixel was calculated for white, black, yellow, red, green and blue states of the pixel. The pixel included four interferometric modulators, each of which was configured to reflect yellow, red, green or blue light in either the closed or open state. In the first instance (e.g., FIG. 16A), the interferometric modulators included a dielectric stack positioned below the second electrically conductive layer. The dielectric stack included layers of alternating refractive indices. The thickness of the layers were equal to about $\lambda*((2n+1)/4)$, where $\lambda$ is a wavelength associated with yellow, red, green or blue light. In the second instance (FIG. 16B), the interferometric modulators did not include a dielectric stack positioned below the second electrically conductive layer but were otherwise the same as the first instance.

Figure 16A:
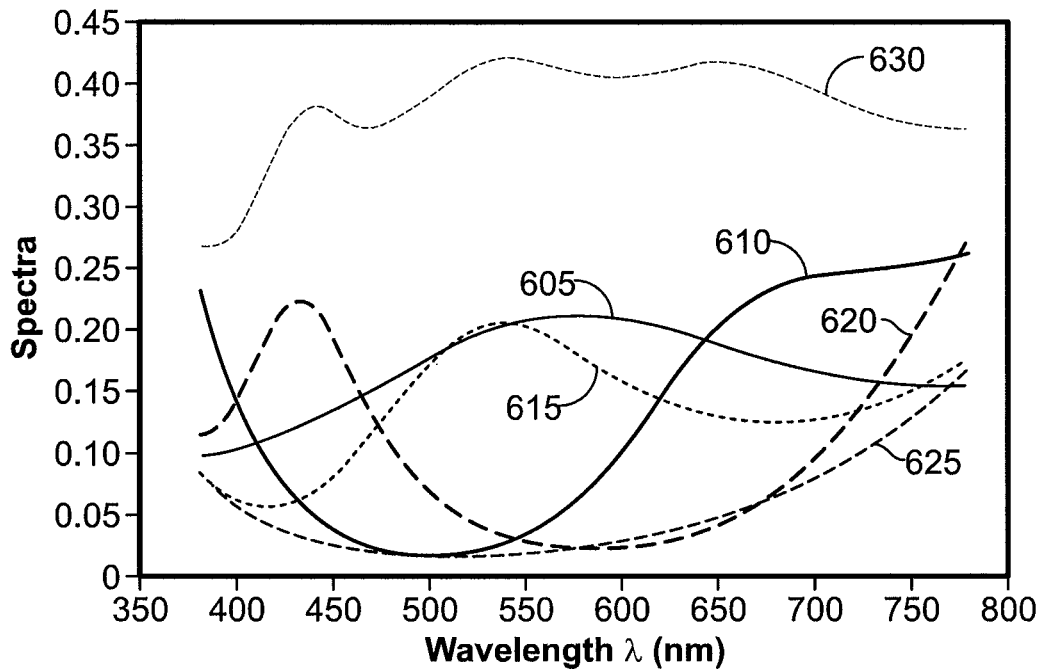
FIGS. 16A and 16B show examples of reflectance spectra for pixels including interferometric modulators.
Figure 16B:
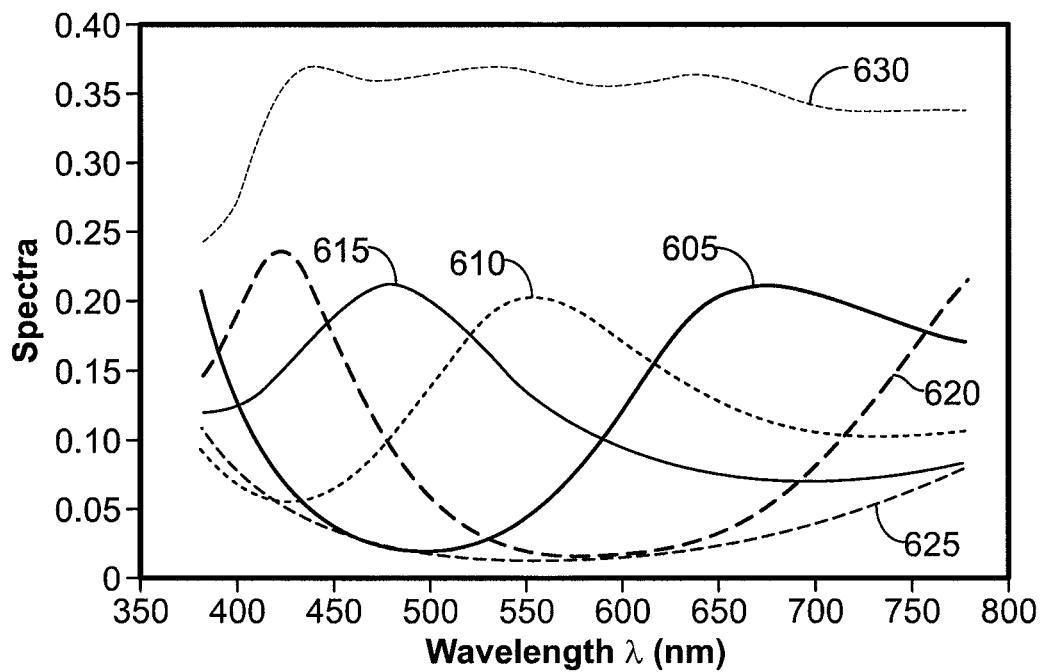

FIGS. 16A and 16B show examples of reflectance spectra for pixels including interferometric modulators. The examples in FIGS. 16A and 16B show the combined spectra 605 associated with the pixel when only the yellow interferometric modulator was in the bright state. Similarly, the examples in FIGS. 16A and 16B show the combined spectra 610, 615 or 620 associated with the pixel when each of the red, green or blue interferometric modulators were in the bright state. The yellow, red, green and blue interferometric modulators differ in the depth of the cavity of the modulator but are otherwise identical. When no modulators are in the bright state, a black spectrum 625 is produced, and when all of the modulators are in the bright state, a white spectrum 630 is produced. The white spectrum 630 was brighter for the first instance (FIG. 16A) for which the dielectric stack was positioned below the second electrically conductive layer than for the second instance (FIG. 16B). The gamut was essentially the same in both instances.

Figure 17A:
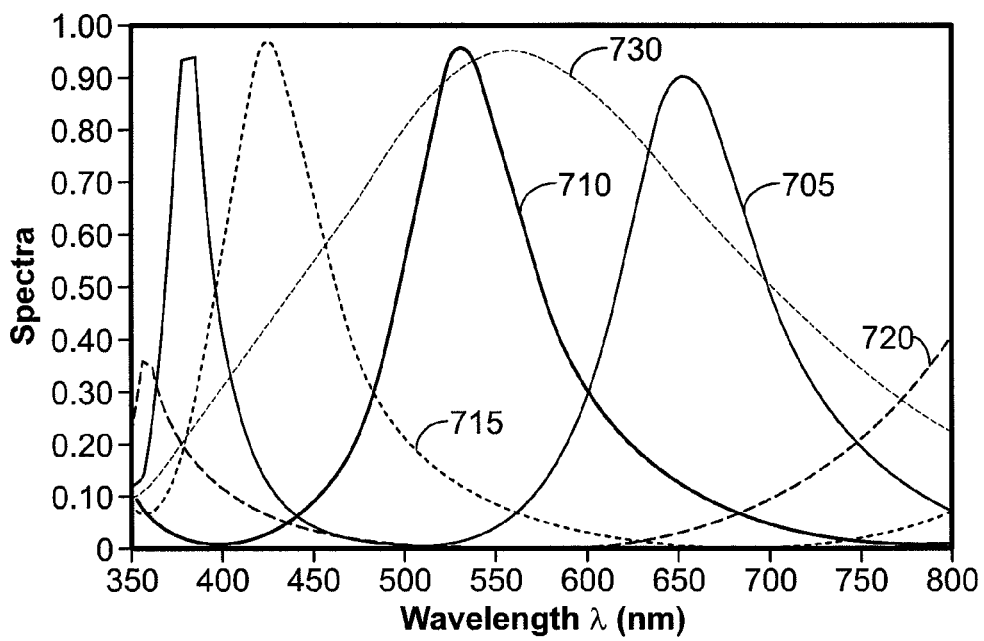
FIGS. 17A and 17B show examples of reflectance spectra for interferometric modulators configured to reflect red, green, or blue light in the dark and bright state.
Figure 17B:
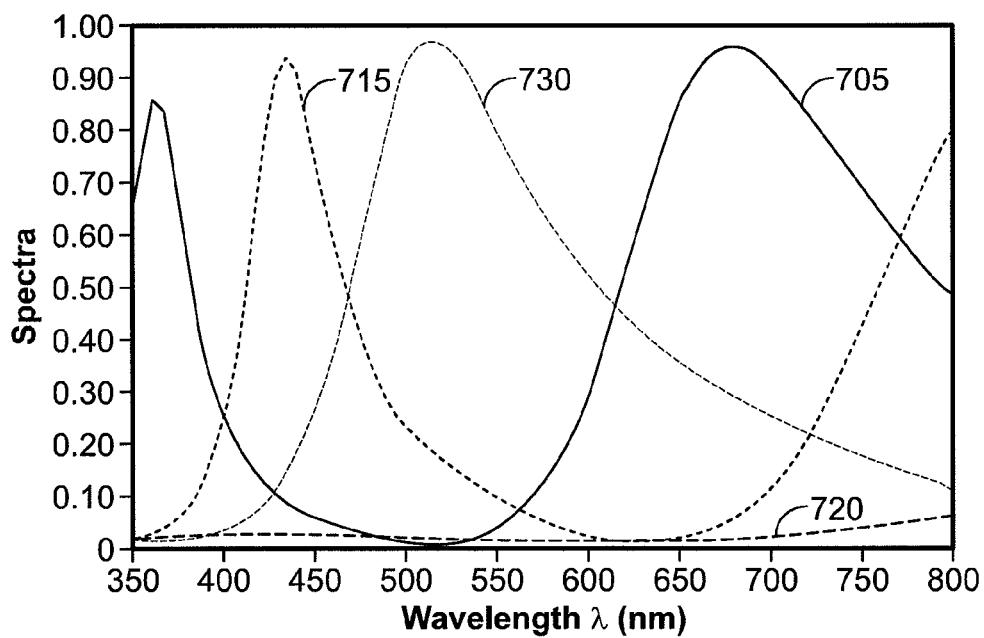

FIGS. 17A and 17B show examples of reflectance spectra for interferometric modulators configured to reflect red, green, or blue light in the dark and bright state. The examples include the spectra 705, 710 or 715 associated with an individual interferometric modulator configured to reflect red, green or blue light when the interferometric modulator was in the bright state. A black spectrum 720 was produced when the interferometric modulator is in the dark state. In the first example, shown in FIG. 17A, the interferometric modulators included a dielectric stack positioned below the second electrically conductive layer, as described above. In the second example, shown in FIG. 17B, the interferometric modulators did not include the coupled dielectric stack. The spectra 705, 710 and 715 associated with the red, green and blue light, respectively, reflectance is brighter in the first instance with the coupled dielectric stack than in the second instance. In the first instance, an interferometric modulator produced a yellow-white reflectance 730 during the bright state when the depth of the cavity was small (<20 nm). The yellow-white reflectance 730 in the first instance was broader than in the second instance. By adjusting the thickness of the dielectric layers within the dielectric stack, the red brightness and saturation may be increased at the expense of the yellow-white brightness.

Figure 18A:
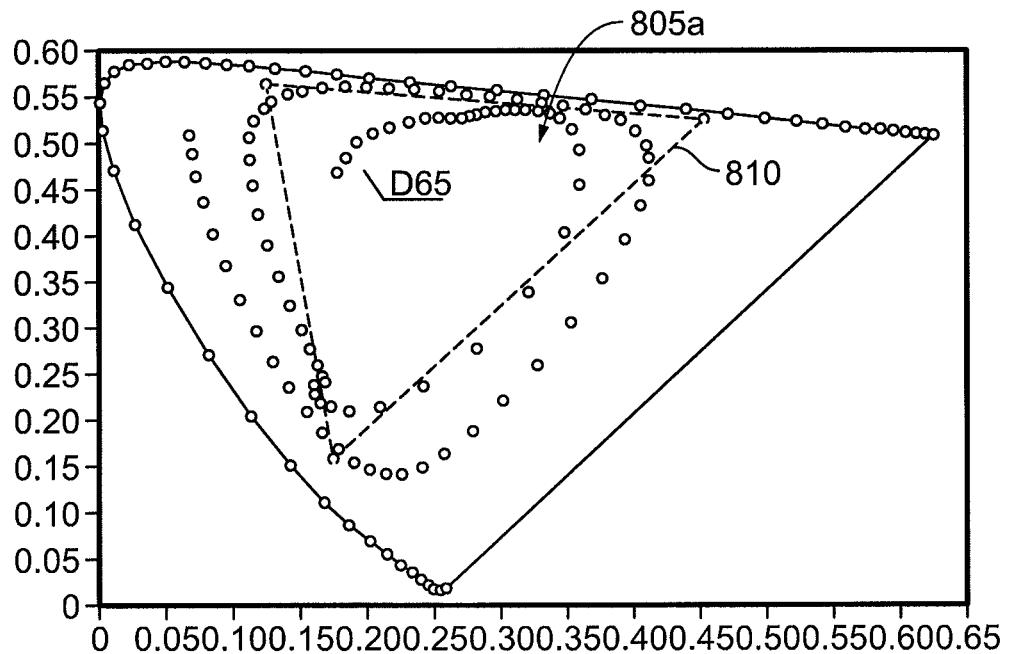
FIGS. 18A and 18B show examples of reflectance spectra for interferometric modulators as the thickness of the optical resonant cavity is varied.
Figure 18B:
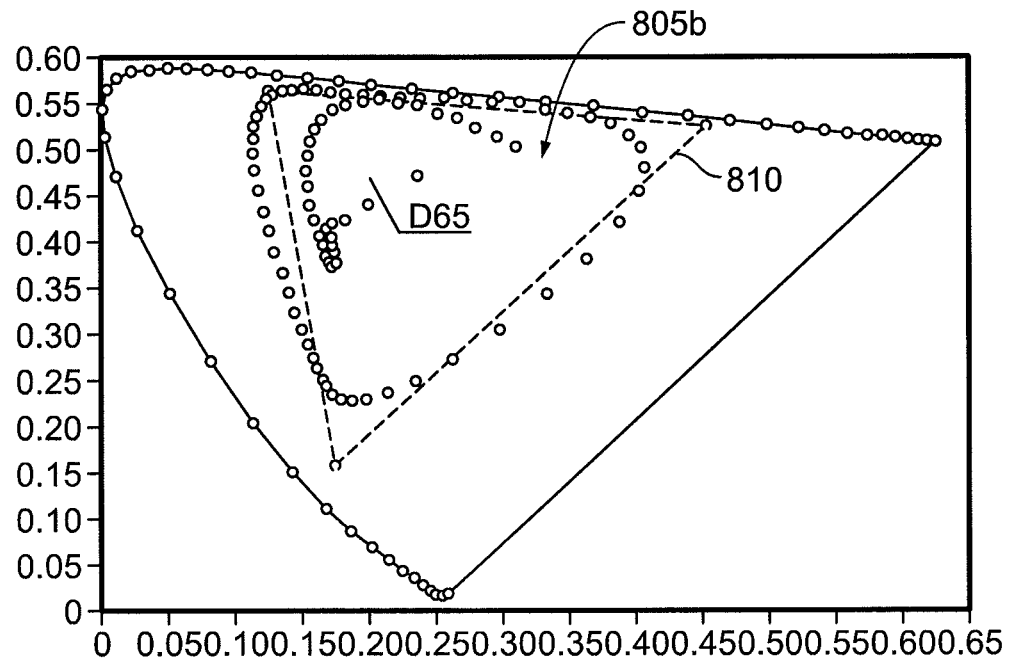

FIGS. 18A and 18B show examples of reflectance spectra for interferometric modulators as the thickness of the optical resonant cavity is varied. The examples in FIGS. 18A and 18B show the spectra 805a of an interferometric modulator including a coupled dielectric stack (FIG. 18A) and the spectra 805b of an interferometric modulator without the coupled dielectric stack (FIG. 18B). The spectra are within the standard RGB color space spectra 810. The D65 indicator shows a standard daylight illumination point. An air gap between the two electrically conductive layers of the interferometric modulator is gradually varied between 0 nm and 500 nm. In the first instance, the interferometric modulator reflects white light when the air gap is equal to 0 nm. As the air gap increases, the reflected light becomes darker until no light is reflected. As the air gap further increases, colored light is reflected, such that blue, green, yellow, red, purple, and then blue light is reflected as the air gap increases. The color reflected by the device cyclically varies upon further increases of the air gap, until eventually only white light is reflected.

However, in the second instance, the interferometric modulator does not reflect light when the air gap is equal to 0. As the air gap is widened, the interferometric modulator reflected color light, such that increasing air gaps produce colors in the order of blue, green, yellow, red, purple and then blue. Again, the color reflected by the device then cyclically varies upon further increases of the air gap, until eventually only white light is reflected. The light reflected by the interferometric modulator with the coupled dielectric stack was brighter than that reflected by the interferometric modulator without the coupled dielectric stack.

Figure 19A:
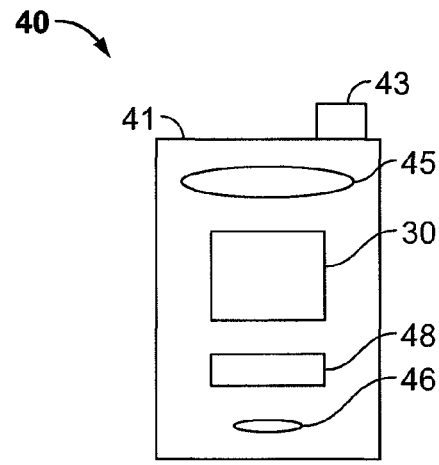
FIGS. 19A and 19B show examples of system block diagrams illustrating a display device that includes a plurality of interferometric modulators.
Figure 19B:
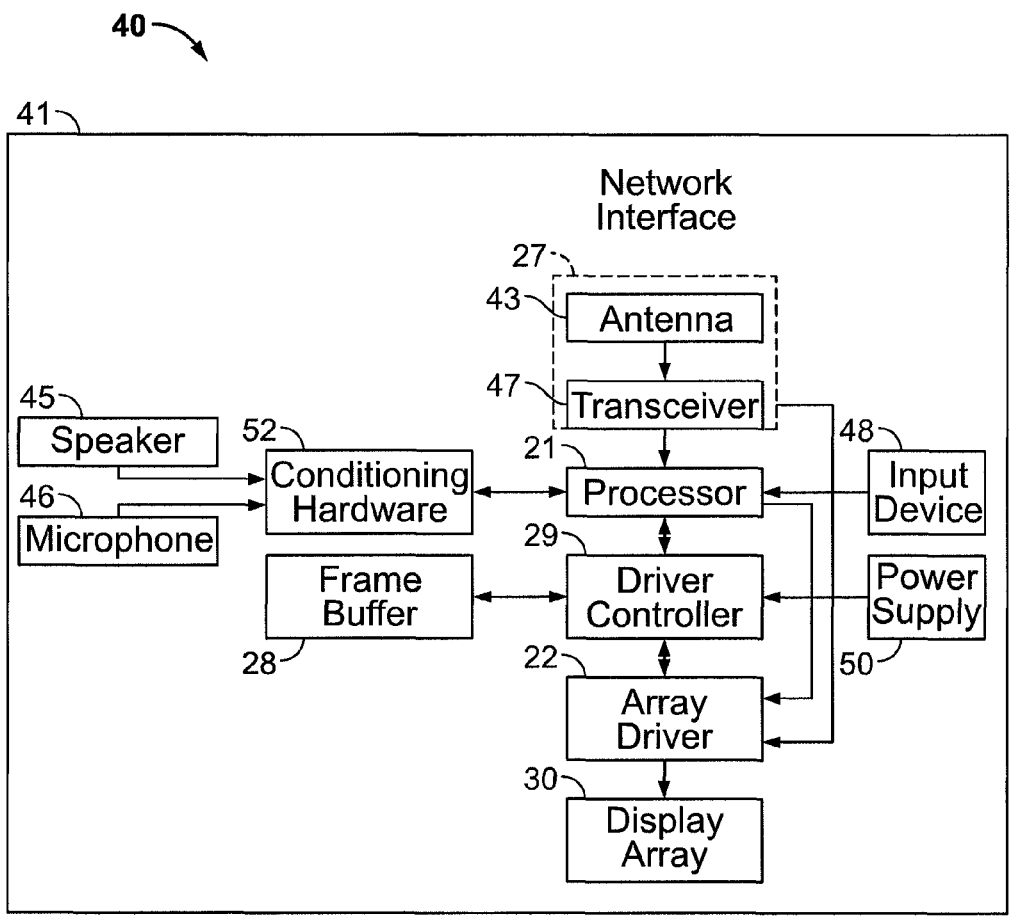

FIGS. 19A and 19B show examples of system block diagrams illustrating a display device 40 that includes a plurality of interferometric modulators. The display device 40 can be, for example, a cellular or mobile telephone. However, the same components of the display device 40 or slight variations thereof are also illustrative of various types of display devices such as televisions, e-readers and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 19B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components as required by the particular display device 40 design.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11 (a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a standalone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (e.g., an IMOD controller). Additionally, the array driver 22 can be a conventional driver or a bi-stable display driver (e.g., an IMOD display driver). Moreover, the display array 30 can be a conventional display array or a bi-stable display array (e.g., a display including an array of IMODs). In some implementations, the driver controller 29 can be integrated with the array driver 22. Such an implementation is common in highly integrated systems such as cellular phones, watches and other small-area displays.

In some implementations, the input device 48 can be configured to allow, e.g., a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A display device comprising:
   a partially transparent and partially reflective layer;
   a first dielectric layer having a first thickness and a first index of refraction characteristic;
   a second dielectric layer having a second thickness and a second index of refraction characteristic, wherein an optical path length of the first dielectric layer through the first thickness is about the same as an optical path length of the second dielectric layer through the second thickness, and wherein the first index of refraction characteristic is greater than the second index of refraction characteristic;
   a reflective layer, wherein the second dielectric layer is disposed between the reflective layer and the first dielectric layer; and
   an optically resonant cavity defined between the partially transparent and partially reflective layer and the reflective layer.

2. The device of claim 1, wherein the first index of refraction characteristic is greater than 2.1.

3. The device of claim 2, wherein the first dielectric layer has an extinction coefficient characteristic that is less than 0.5.

4. The device of claim 3, wherein the first dielectric layer includes at least one of zirconium dioxide, titanium dioxide, gallium phosphide, silicon, gallium nitride, indium phosphide and hafnium oxide.

5. The device of claim 1, wherein the second index of refraction characteristic is less than 1.6.

6. The device of claim 5, wherein the second dielectric layer includes at least one of magnesium fluoride and silicon dioxide.

7. The device of claim 1, wherein the first thickness is between about 20 nm and about 100 nm.

8. The device of claim 1, wherein the second thickness is between about 20 nm and about 100 nm.

9. The device of claim 1, wherein the optical path length of the first dielectric layer through the first thickness is between $(1/8)*\lambda$ and $(3/8)*\lambda$.

10. The device of claim 1, further comprising an air gap defined between the partially transparent and partially reflective layer and the first dielectric layer.

11. The device of claim 1, further comprising:
    a display;
    a processor that is configured to communicate with the display, the processor being configured to process image data; and
    a memory device that is configured to communicate with the processor.

12. The device of claim 11, further comprising:
    a driving circuit configured to send at least one signal to the display; and
    a controller configured to send at least a portion of the image data to the driver circuit.

13. The device of claim 12, further comprising a controller configured to send at least a portion of the image data to the driver circuit.

14. The device of claim 11, further comprising an image source module configured to send the image data to the processor.

15. The device of claim 14, wherein the image source module includes at least one of a receiver, transceiver, and transmitter.

16. The device of claim 11, further comprising an input device configured to receive input data and to communicate the input data to the processor.

17. A display device comprising:
    means for partially reflecting and partially transmitting light;
    first dielectric means having a first thickness and a first index of refraction characteristic;
    second dielectric means having a second thickness and a second index of refraction characteristic, wherein an optical path length of the first dielectric means through the first thickness is about the same as an optical path length of the second dielectric means through the second thickness, wherein the first index of refraction characteristic is greater than the second index of refraction characteristic, wherein the first dielectric means is disposed between the partially reflective and partially transmissive means and the second dielectric means;
    means for reflecting light, wherein the second dielectric means is disposed between the reflective means and the first dielectric means; and
    optically resonant means defined between the partially reflective and partially transmissive means and the reflective means.

18. The device of claim 17, wherein the first index of refraction characteristic is greater than 2.1.

19. The device of claim 17, wherein the second index of refraction characteristic is less than 1.6.

20. The device of claim 17, wherein the optical path length of the first dielectric means through the first thickness is between $(1/8)*\lambda$ and $(3/8)*\lambda$.

21. A method of manufacturing a display device, the method comprising:
    providing a substrate;
    forming a partially reflective and partially transmissive layer on the substrate;
    forming a sacrificial layer on the partially transparent and partially reflective layer;
    forming a first dielectric layer on the sacrificial layer, the first dielectric layer having a first thickness and a first index of refraction characteristic;
    forming a second dielectric layer on the first dielectric layer, the second dielectric layer having a second thickness and a second index of refraction characteristic, wherein an optical path length of the first dielectric layer through the first thickness is about the same as an optical path length of the second dielectric layer through the second thickness, wherein the first index of refraction characteristic is greater than the second index of refraction characteristic;
    forming a reflective layer on the second dielectric layer; and
    removing the sacrificial layer.

22. The method of claim 21, wherein the first index of refraction characteristic is greater than 2.1.

23. The method of claim 21, wherein the second index of refraction characteristic is less than 1.6.

24. The method of claim 21, wherein the optical path length of the first dielectric layer through the first thickness is between $(1/8)*\lambda$ and $(3/8)*\lambda$.

* * * * *